(12) United States Patent
Song et al.

(10) Patent No.: US 8,926,819 B2
(45) Date of Patent: Jan. 6, 2015

(54) ELECTRO-PENETRATIVE TYPE SLUDGE WEIGHT REDUCING APPARATUS

(75) Inventors: Tae Gyu Song, Gyeonggi-do (KR); Hyun Jic Woo, Gyeonggi-do (KR)

(73) Assignee: Dong-il Canvas Engineering Co., Ltd., Gyeonggi-Do (KR)

( * ) Notice: Subject to any disclaimer, the term of this patent is extended or adjusted under 35 U.S.C. 154(b) by 588 days.

(21) Appl. No.: 13/378,217

(22) PCT Filed: Jun. 15, 2010

(86) PCT No.: PCT/KR2010/003838
§ 371 (c)(1),
(2), (4) Date: Dec. 14, 2011

(87) PCT Pub. No.: WO2010/147364
PCT Pub. Date: Dec. 23, 2010

(65) Prior Publication Data
US 2012/0091006 A1    Apr. 19, 2012

(30) Foreign Application Priority Data

| Jun. 15, 2009 | (KR) | 10-2009-0052752 |
| Aug. 18, 2009 | (KR) | 10-2009-0076087 |
| Feb. 23, 2010 | (KR) | 10-2010-0015950 |
| Feb. 23, 2010 | (KR) | 10-2010-0015951 |

(51) Int. Cl.
B01D 61/56    (2006.01)
B01D 61/42    (2006.01)
C02F 11/00    (2006.01)
C02F 11/12    (2006.01)

(52) U.S. Cl.
CPC ............ B01D 61/427 (2013.01); C02F 11/006 (2013.01); C02F 11/122 (2013.01)
USPC ......................................... 204/648; 204/649

(58) Field of Classification Search
USPC ................................................. 204/648, 649
See application file for complete search history.

(56) References Cited

U.S. PATENT DOCUMENTS 6,871,744 B2 *    3/2005    Miller et al. ................... 210/350

FOREIGN PATENT DOCUMENTS

| KR | 20090027602 A | 3/2009 |
| KR | 10-0894266 B1 | 4/2009 |
| KR | 20090026261 B1 | 11/2009 |
| KR | 20090926262 B1 | 11/2009 |

* cited by examiner

*Primary Examiner* — Arun S Phasge
(74) *Attorney, Agent, or Firm* — DeLio, Peterson & Curcio LLC; Peter W. Peterson

(57) ABSTRACT

Disclosed is an electro-penetrative type sludge weight reducing apparatus, which can uniformly dehydrate sludge by gradually applying the same pressure over an entire surface of the sludge and applying the same voltage to the sludge and includes a sludge supplier, which can minutely and precisely control a compression height for the sludge according to characteristics and a thickness of the sludge and maximize a moisture reducing efficiency of the sludge by uniformly supplying the sludge having a desired thickness to an entire width of a conveyor belt and an electrode plate with improved insulation safety.

29 Claims, 10 Drawing Sheets

ELECTRO-PENETRATIVE TYPE SLUDGE WEIGHT REDUCING APPARATUS

BACKGROUND OF THE INVENTION

1. Field of the Invention

The present invention relates to an electro-penetrative type sludge weight reducing apparatus for dehydrating sludge. More particularly, the present invention relates to an electro-penetrative type sludge weight reducing apparatus including a sludge supplier, which can apply the same pressure stage by stage and apply the same voltage to uniformly dehydrate sludge, minutely and precisely control a compression height of sludge according to characteristics and a thickness of the sludge, and uniformly supply sludge having a desired thickness over an entire width of a conveyor belt to maximize an efficiency of reducing sludge moisture, and an insulation safety reinforcing electrode plate.

2. Description of the Prior Art

As generally known in the art, a polymer coagulant is added to sludge processed in wastewater and discharging water treatment plants in order to purify water and it is very difficult to dehydrate the sludge agglomerated by the polymer coagulant. Meanwhile, since disposal costs of sludge vary depending on a dehydration rate of the sludge, it is required to significantly reduce a content rate of the sludge in order to decrease costs or obtain a solid component of the sludge, which can be recycled as a fuel. The electro-penetrative type sludge weight reducing apparatus for reducing the content rate of the sludge according to the conventional arts as described above will be discussed in the following description. Korean Patent Application No. 1993-0010856 discloses an electro-penetrative type sludge weight reducing apparatus including a rotation drum having an anode electrode for removing water combined with sludge by an electric field, a compression belt having permeability of water configured to surround an outer circumference of the rotation drum, and a filter belt configured to be overlapped with surfaces of dehydration areas of the rotation drum and the compression belt. That is, the electro-penetrative type sludge weight reducing apparatus applies a constant voltage between the drum and the compression belt to form an electric field in the sludge, and thus separates water from the sludge and dehydrates the sludge. However, a method of applying a voltage to the rotation drum has a complicated structure and manufacturing process, and accordingly manufacturing costs are increased. Further, when high capacity sludge is processed, a large sized rotation drum is needed, which makes the maintenance of the apparatus and an accurate gradational control of an electro-chemical reaction for dehydration difficult. Accordingly, Korean Patent Registration No. 10-0894266 for solving the aforementioned problem of the electro-penetrative type sludge weight reducing apparatus has been proposed. The proposed electro-penetrative type sludge weight reducing apparatus mainly includes a filter cloth 1600 for conveying sludge, and a sludge elevating means 1700 for pressurizing and dehydrating sludge supplied to the filter cloth 1600, a plurality of sludge elevating means 1700 being horizontally installed in a frame 1100. Meanwhile, the sludge elevating means 1700 having a plurality of rows are arranged in an upper portion of the frame 110 in a lengthwise direction. The sludge elevating means 1700 is operated to have the different numbers of sludge elevating means 1700 for pressurizing the sludge and different pressurization heights of the sludge elevating means 1700 by differently controlling pressures applied to the sludge according to characteristics of the sludge in a wastewater or a discharging water treatment plant.

However, the characteristics of the sludge are changed according to seasons or environments, and widths of supplied sludge, so the pressure and the voltage applied to the sludge should be changed, but it is not easy to change the applied pressure and voltage in the proposed electro-penetrative type sludge weight reducing apparatus. Further, in a case of non-biodegradable sludge, an applied pressure should be minutely changed because of difficulties in dehydration, but the sludge elevating means 1700 arranged in a plurality of rows cannot minutely and precisely control the applied pressure and take up much space due to their long lengths in a lengthwise direction. Furthermore, since the sludge elevating means 1700 are arranged in a plurality of rows, the number of elevations for dehydrating the sludge is increased, and thus a dehydration processing time is increased, which creates problems in that dehydration throughputs are significantly reduced, manufacturing and installing costs of the sludge elevating means 1700 are greatly increased, and an operating method becomes difficult. Moreover, the sludge elevating means 1700 arranged in a plurality of rows cannot apply a constant and uniform pressure to an entire width of the sludge. That is, in pressurizing the sludge, a dehydration rate of the sludge is largely changed by a difference of a compression height of several mm, so that it is required to develop a technology, which can apply the same pressure to the entire surface of the sludge.

Further, it is preferable to minimize a water content rate indicating an amount of water contained in the sludge in order to process sludge from discharging water and wastewater or sludge from livestock excretions through methods such as burying, drying, or incineration in the ground, instead of disposing the sludge in the sea. For this purpose, apparatuses for removing moisture contained in the sludge by using various methods were developed in the conventional arts. For example, Korean Patent Application No. 10-2005-0108803 discloses a drum rotary typed electric dehydrator. That is, the conventional drum rotary type electric dehydrator applies direct current power to the sludge supplied to an inside of a drum to cause an electro-penetrative operation to the sludge, which reduces moisture of the sludge. Here, in order to reduce moisture of the sludge through the electro-penetrative operation as described above, it is preferable that sludge having a uniform thickness is inserted within the drum over an entire width of the electrode, but in the conventional arts, a separate equipment for implementing a uniform thickness of the sludge provided to the electric dehydrator did not exist, so that excessive abrasion of the electrode was caused in removing moisture and the excessive abrasion of the electrode caused a problem such as reduction of life spans of facilities.

Further, in a procedure of purifying water processed in wastewater and discharging water treatment plants, a polymer coagulant, which makes the sludge become an agglomerated state, is added, so that water purification is facilitated and a purification process becomes convenient. The agglomerated sludge should pass through a dehydration operation for removing moisture from the sludge for a processing since it contains much moisture. A work for reducing a water content rate of the agglomerated sludge through the dehydration operation corresponds to a very important process in an aspect of reduced disposal costs and possibility of various recycling. Further, when the water content rate of the sludge can be greatly reduced, the sludge can be recycled as a solidified fuel instead of being discarded. For this purpose, various methods are applied to the dehydration process of the agglomerated sludge. For example, the methods include a compressive type, which removes moisture by pressurizing the sludge, or an electro-penetrative type, which removes water through ion mobility. However, it is not easy to dehydrate the sludge by using the compressive type, which simply pressurizes the sludge, because the agglomerated sludge is a product generated by reacting with the polymer coagulant, and particularly, it is very difficult to significantly lower the water content rate of the sludge up to a degree where the sludge may be recycled as a solidified fuel, so the electro-penetrative type having a high dehydration capability is mainly used. The electro-penetrative type includes a rotation drum having an anode electrode and a compression belt having permeability of water configured to surround an outer circumference of the rotation drum. A voltage applied between the rotation drum and the compression belt forms an electric field and charged water moves to an opposite electrode of a sludge particle charge, so that the moisture is removed from the sludge. However, an electro-penetrative type apparatus having a rotation drum to which a voltage is applied requires a complicated structure, difficult manufacturing process, and high manufacturing costs, and also has difficulties in the maintenance as the apparatus becomes larger and difficulties in a gradational control of an electrochemical reaction when the apparatus is operated. Unlike the above, a horizontally conveying type electro-penetrative type apparatus can implement the same performance as the electro-penetrative type apparatus without the rotation drum by using a filter cloth for horizontally conveying sludge between electrode plates having +/− electrodes and applying compression and electric dehydration together. As described above, the horizontally conveying type electro-penetrative type apparatus has the same advantages of the rotation drum type apparatus without the rotation drum generating a magnetic field and simultaneously solves a disadvantage of the rotation drum type apparatus. Particularly, the horizontally conveying type electro-penetrative type apparatus provides an advantage of easy production and cheap maintenance costs for throughputs. The horizontally conveying typed electro-penetrative type apparatus requires that a first and a second electrode plate implement a stable electric field capability, a perfect insulation structure, and an easy assembly between many components, because the apparatus has characteristics of forming an electric field through the first electrode and the second electrode in an environment where the apparatus always contacts moisture while pressurizing horizontally conveyed sludge. However, the perfect insulation structure and the easy assembly structure are not compatible, so the first electrode and the second electrode applied to the horizontally conveying type electro-penetrative type apparatus has limitations in meeting both conditions while not increasing manufacturing costs. For example; when the perfect structure of the first electrode and the second electrode is focused upon, the number of components for a whole construction cannot help being increased and the assembly structure cannot help being complicated. On the other hand, when the easy assembly structure is focused upon, somewhat unsatisfactory insulation structure may be applied. When it is attempted to satisfy both conditions, price competitiveness is undermined.

Accordingly, it is required to develop and research an electro-penetrative type sludge weight reducing apparatus, which can solve the above mentioned problems.

SUMMARY OF THE INVENTION

Accordingly, the present invention has been made to solve the above-mentioned problems occurring in the prior art, and the present invention provides an electro-penetrative type sludge weight reducing apparatus, which can uniformly and efficiently dehydrate sludge by pressurizing entire surfaces of the sludge with the same pressure stage by stage and applying the same voltage to the sludge.

Further, the present invention provides an electro-penetrative type sludge weight reducing apparatus, which can maximize a moisture reducing efficiency of the sludge by freely controlling a thickness of the sludge such that the sludge has a desired thickness through a hopper from an outside, and uniformly supplying sludge conveyed by a conveyor belt over entire widths of the conveyor belt.

Furthermore, the present invention provides an electro-penetrative type sludge weight reducing apparatus, in which a first electrode and a second electrode have an insulation structure, the number of components is minimized, the first and second electrodes are formed in the unit of an independent module to be easily manufactured and assembled, the first and second electrode are inspected and fixed in the unit of a module, a plurality of first and second electrodes are manufactured and assembled, so that a sludge dehydration process length is easily extended.

In accordance with a first exemplary embodiment of the present invention, there is provided an electro-penetrative type sludge weight reducing apparatus including: a frame having a predetermined shape; a filter cloth conveyor configured to infinitely rotate a filter cloth and formed in a lengthwise direction of the frame; a sludge supplier configured to supply sludge to an upper portion of the filter cloth and formed in one side of the filter cloth conveyor; a dehydrator for compressing sludge supplied to an upper portion of the filter cloth conveyor by first and second electrode parts, applying a voltage, and forming an electric field to dehydrate the sludge, the dehydrator including the first electrode part formed above the filter cloth conveyed by the filter cloth conveyor and the second electrode part formed under the filter cloth to face the first electrode part; a driver configured to elevate the dehydrator and fixedly formed on the frame above the dehydrator; and a controller for controlling the driver to control a compression height of the dehydrator for the sludge and controlling a voltage applied to the first and second electrode parts, wherein the dehydrator dehydrates the sludge supplied to the upper portion of the filter cloth conveyor by a substantially identical pressure and voltage.

In accordance with a second exemplary embodiment of the present invention, there is provided an electro-penetrative type sludge weight reducing apparatus including: a frame having a predetermined shape; a filter cloth conveyor configured to infinitely rotate a filter cloth and formed in a lengthwise direction of the frame; a sludge supplier configured to supply sludge to an upper portion of the filter cloth and formed in one side of the filter cloth conveyor; a dehydrator for compressing sludge supplied to an upper portion of the filter cloth conveyor by first and second electrode parts, applying a voltage, and forming an electric field to dehydrate the sludge, the dehydrator including the first electrode part formed above the filter cloth conveyed by the filter cloth conveyor and the second electrode part formed under the filter cloth to face the first electrode part; a driver configured to elevate the dehydrator and fixedly formed on the frame above the dehydrator; and a controller for controlling the driver to control a compression height of the dehydrator for the sludge and controlling a voltage applied to the first and second electrode parts, wherein the dehydrator dehydrates the sludge supplied to the upper portion of the filter cloth conveyor by a substantially identical pressure and voltage, and the driver is interworked with rotation of a driving motor to elevate the first electrode part, the driver including a fixing plate fixedly formed on the frame, at least two screw jacks inserted through one side of the fixing plate to be fixedly coupled to one side of the first electrode part, interworking shafts for providing rotation force to the screw jacks, a gear box for changing a speed of the rotation force provided to each of the interworking shafts, and a driving motor for providing rotation force to the gear box.

It is preferred that the controller controls the first electrode part of the dehydrator to gradually descend the first electrode part in a direction toward the sludge according to a dehydration amount of the sludge and applies an identical pressure and voltage.

It is preferred that the first electrode part includes a first electrode plate configured to apply a substantially identical pressure and voltage to the sludge, voltage terminals configured to apply a voltage to the first electrode plate and arranged such that the voltage terminals are uniformly spaced apart from each other on the first electrode plate, and a conductive member configured to conduct a voltage to the voltage terminals.

It is preferred that the first electrode part further includes a reinforcement member for reinforcing and supporting the first electrode plate.

It is preferred that the screw jack includes four screw jacks inserted through four corners of the fixing plate to be fixedly coupled to four corners corresponding to the first electrode part.

It is preferred that the electro-penetrative type sludge weight reducing apparatus further includes a height detector for calculating a number of rotations of the interworking shaft or the driving motor to detect a compression height of the first electrode part and detecting a compression height for the sludge of the first electrode part of the dehydrator by the driver.

It is preferred that the electro-penetrative type sludge weight reducing apparatus further includes a guide fixedly formed on the first electrode part by being inserted through the fixing plate and an elevation limit detector for detecting an elevation limit of the guide according to an elevation of the first electrode part of the dehydrator by the driver.

It is preferred that the electro-penetrative type sludge weight reducing apparatus further includes an elevation limit detector frame fixedly formed on the fixing plate in an elevating direction of the guide and having the elevation limit detector mounted thereto.

It is preferred that the electro-penetrative type sludge weight reducing apparatus further includes an exhaust pipe for discharging wet steam generated from sludge gradually dehydrated by the dehydrator, the exhaust pipe being fixedly formed on the first electrode part of the dehydrator.

It is preferred that the electro-penetrative type sludge weight reducing apparatus further includes a ventilator for supplying wet stream generated from sludge in which dehydration is completed by the dehydrator, the ventilator being fixedly formed on the frame in an opposite side of the filter cloth conveyor.

In accordance with a third exemplary embodiment of the present invention, there is provided an electro-penetrative type sludge weight reducing apparatus for compressing sludge from an upper part and a lower part of a filter cloth 221, forming an electric field with supplied power, and charging moisture within the sludge to implement dehydration, the filter cloth 221 configured to convey sludge through an infinite orbit rotation while winding a plurality of rollers and horizontally arranged, the electro-penetrative type sludge weight reducing apparatus including: first electrode modules 241n for converting a rotation of a driving motor 255 to a vertically moving force to compress sludge by a first electrode plate 241-1 and forming a positive (+) electrode with supplied power, the first electrode modules 241n including one or more first electrode plates 241-1 closely arranged to each other according to a uniformly divided length of the filter cloth 221 above the filter cloth 221; and second electrode parts 242 for forming a negative (−) electrode with supplied power to charge moisture within the sludge together with the first electrode plates 241-1, the second electrode parts 242 including second electrode plates 242-1 arranged to have an identical size and number to those of the first electrode plates 241-1 under the filter cloth 221, wherein the second electrode part 242 is mounted to a lower frame 211 having a height adjusting means 242-4 for adjusting a height for the filter cloth 221 and the first electrode module 241n is mounted to an upper frame 212 forming an upper part of the lower frame 211, and the filter cloth 221 for winding a plurality of rollers installed in the lower frame 211 and the upper frame 212 to be rotated by power of a motor in a horizontal state and conveying sludge discharged from the sludge supplier 230 installed in one side of the upper frame 212, the filter cloth 221 having a longer length than that of the upper frame 212.

In accordance with a fourth exemplary embodiment of the present invention, there is provided an electro-penetrative type sludge weight reducing apparatus for compressing sludge from an upper part and a lower part of a filter cloth 221, forming an electric field with supplied power, and charging moisture within the sludge to implement dehydration, the filter cloth 221 configured to convey sludge through an infinite orbit rotation while winding a plurality of rollers and horizontally arranged, the electro-penetrative type sludge weight reducing apparatus including: first electrode modules 241n for converting a rotation of a driving motor 255 to a vertically moving force to compress sludge by a first electrode plate 241-1 and forming a positive (+) electrode with supplied power, the first electrode modules 241n including one or more first electrode plates 241-1 closely arranged to each other according to a uniformly divided length of the filter cloth 221 above the filter cloth 221; and second electrode parts 242 for forming a negative (−) electrode with supplied power to charge moisture within the sludge together with the first electrode plates 241-1, the second electrode parts 242 including second electrode plates 242-1 arranged to have an identical size and number to those of the first electrode plates 241-1 under the filter cloth 221, wherein the first electrode module 241n includes a driving motor 255 driven by a control of a controller 227, a driver for converting a rotation of the driving motor 255 to an upward/downward movement, and a first electrode part 241 for receiving a moving force in a downward direction of the driver to pressurize sludge laid on the filter cloth 221 and forming an electric field with a supplied voltage.

It is preferred that the driver includes a gear box 254 for receiving a rotation of the driving motor 255 to convert the rotation of the driving motor 255 to a vertical straight direction, pressurizing members 257 for following a straight movement of the gear box 254, a plate-shaped fixing plate 251 for receiving power through the pressurizing member 257 to move, screw jacks for allowing the fixing plate 251 to be located in its position and guiding a movement of the fixing plate 251, an insulation member 256-1 provided to the screw jack 252 of the fixing plate 251, and an insulation member 256-2 installed in the fixing plate 251.

It is preferred that the pressurizing members 257 includes a pair of pressurizing members 257 arranged in both sides of the gear box 254, and the screw jacks 252 are provided to four corner portions of the fixing plate 251.

It is preferred that the first electrode part 241 includes the first electrode plate 241-1 including at least one power terminal 241-1a for receiving a voltage through a controller 227 to form a positive (+) electrode, an insulation member 241-6 made of insulation materials to have an insulation structure for the first electrode plate 241-1, a mounting frame 241-7 fixed by a fixing member 241-8 inserted to an inner space of an upper portion of the insulation member 241-6 to be coupled to a side surface of the insulation member 241-6 and to form a space with which the power terminal 241-1a is not in contact, the mounting frame 241-7 being made of steel materials, and a fixing member 241-9 coupled to the upper portion of the insulation member 241-6 without extending through the first electrode plate 241-1.

It is preferred that the insulation member 241-6 includes a base plate 241-6a including a side wall plate 241-6b having a predetermined width and height and forming an edge to form a space part 241-6c in which the power terminal 241-1a welded to the first electrode plate 241-1 inwardly protrudes, wherein the space part 241-6c is partitioned by partition walls having an identical width and height to those of the side wall plate 241-6b to be divided into a plurality of spaces and a plurality of tap holes are processed in the base plate 241-6a and the side wall plate 241-6b.

It is preferred that the power terminal 241-1a includes a welding bolt 241-1a1 welded to the first electrode plate 241-1 to connect a power line with the first electrode plate 241-1, a nut 241-1a2 coupled to the welding bolt 241-1a1, and a seal 241-1a3 patched on a position where the nut 241-1a2 is located.

It is preferred that the mounting frame 241-7 includes a frame body 241-7a having an empty space and a predetermined thickness and a rigid body 241-7b crossing a center of a width of the frame body 241-7a to strengthen the rigidity.

In accordance with a fifth exemplary embodiment of the present invention, there is provided an electro-penetrative type sludge weight reducing apparatus for compressing sludge from an upper part and a lower part of a filter cloth 221, forming an electric field with supplied power, and charging moisture within the sludge to implement dehydration, the filter cloth 221 configured to convey sludge through an infinite orbit rotation while winding a plurality of rollers and horizontally arranged, the electro-penetrative type sludge weight reducing apparatus including: first electrode modules 241n for converting a rotation of a driving motor 255 to a vertically moving force to compress sludge by a first electrode plate 241-1 and forming a positive (+) electrode with supplied power, the first electrode modules 241n including one or more first electrode plates 241-1 closely arranged to each other according to a uniformly divided length of the filter cloth 221 above the filter cloth 221; and second electrode parts 242 for forming a negative (−) electrode with supplied power to charge moisture within the sludge together with the first electrode plates 241-1, the second electrode parts 242 including second electrode plates 242-1 arranged to have an identical size and number to those of the first electrode plates 241-1 under the filter cloth 221, wherein the second electrode parts 242 include a plurality of second electrode plates 242-1 having one or more power terminals 242-1a to independently receive supplied power, supports 242-2 for individually surrounding the second electrode plates 242-1, an insulation member 242-3 for surrounding the plurality of second electrode plates 242-1 closely arranged to each other for insulation, a steel material support frame 242-5 for fixing the insulation member 242-3, fixing members 242-2a, 242-5b, and 242-7 coupled to a plurality of fixation holes 242-6a1, 242-6a2, and 242-6b1 having a depth not to extend through a thickness of the insulation member 242-3 in a top surface, a bottom surface, and a side surface of the insulation member 242-3.

It is preferred that the power terminal 242-1a is in contact with the second electrode plate 242-1 while being fixed to the insulation member 242-3 by the fixing member 242-7.

It is preferred that the support 242-2 surrounds a side surface of the second electrode plate 242-1 in a lengthwise direction while an upper surface of the second electrode plate 242-1 is exposed.

It is preferred that the insulation member 242-3 includes a base plate 242-3a forming a bottom surface and a side wall plate 242-3b having a predetermined height and being bent to form a side surface of the base plate 242-3a.

It is preferred that the base plate 242-3a has a length to allow only one side wall plate 242-3b to be formed so that the insulation members 242-3 has a pair of insulation members 242-3 having an identical structure to each other in assembling.

It is preferred that the support frame 242-5 has a structure in which a bottom surface of the support frame 242-5 is opened, and includes at least one coupling end 242-5a assembled with another component.

It is preferred that the electro-penetrative type sludge weight reducing apparatus further includes left/right side plates 234 facing each other, a sludge supply roller 233 arranged in a structure having a plurality of rows on the left/right side plates 234, a conveying means 237 for supplying sludge discharged by a sludge supply roller driving means 235 operating the sludge supply roller 233 to a sludge dehydrating apparatus, and a hopper 231 installed above the sludge supply roller 233 in order to allow a predetermined amount of sludge supplied to the sludge supply roller 233 to stay in the hopper 231, wherein the sludge supply roller 233 includes a pair of upper rolls 233a installed such that the upper rolls 233a are faced to each other and spaced apart from each other in an upper portion of the left/right side plates 234, and a pair of lower rolls 233b installed such that the lower rolls 233b are faced to each other and spaced apart from each other in a lower portion of the upper rolls 233a and each of rotating directions of the rolls facing each other are set as an opposite direction from each other, and the sludge supply roller 233 further includes a guide member 233-1 installed so as to guide the sludge between the upper roll 233a and the lower roll 233b.

It is preferred that the left/right side plates 234 is seated on a frame 210 for supporting a sludge dehydrating apparatus and supported by means of a coupling member 234-1, and the left/right side plates 234 are installed to stand with respect to the frame 210 by means of a fixing member 234-2.

It is preferred that at least one of the lower rolls 233b is installed to change a fixed position by means of a moving member 233-3 with respect to the left/right side plates 234.

It is preferred that a scraper 233-2 for preventing sludge attached to the upper roll 233a and the lower roll 233b from moving to a rear side is installed in the upper roll 233a and the lower roll 233b.

It is preferred that the electro-penetrative type sludge weight reducing apparatus further includes a sludge supply amount detecting sensor 232 for detecting an amount of sludge staying in the hopper 231.

It is preferred that the electro-penetrative type sludge weight reducing apparatus further includes a controller for controlling an operation of the sludge supply roller driving means 235 by means of a signal output from the sludge supply amount detecting sensor 232.

According to the present invention, the first electrode part for pressurizing sludge is integrally formed to correspond to an entire surface of the sludge, and the entire surface of the sludge is gradually pressurized by the same pressure and applied by the same voltage, so that the sludge may be efficiently dehydrated. Further, since the same pressure is applied to the entire surface of the sludge, a dehydration processing time is remarkably reduced, a device for a dehydration processing amount may be smaller, and maintenance costs are decreased.

Further, according to the present invention, the first electrode part for pressurizing sludge is integrally formed, and the entire surface of the sludge is gradually pressurized by the same pressure and applied by the same voltage, so that the sludge may be efficiently dehydrated. Further, through the height detector, it is possible to precisely control the driver by the controller, and thus a constant dehydration rate by the dehydrator may be implemented. A limited elevation height according to characteristics and thicknesses of the sludge is preset through the elevation limit detector, so that it is possible to constantly and uniformly maintain the dehydration rate for the sludge although the characteristics and the thicknesses of the sludge supplied to the sludge supplier are changed. Wet steam generated from the sludge is supplied and discharged to an outside through the exhaust pipe and the ventilator, so that corrosion of the apparatus is prevented and thus a life span of the apparatus may be further extended. Further, since the same pressure is applied to the entire surface of the sludge, a dehydration processing time is remarkably reduced, a device for a dehydration processing amount may be smaller, and maintenance costs are deceased.

Moreover, according to the present invention, a thickness of the sludge provided to the electro-penetrative type sludge weight reducing apparatus from an outside through the hopper may be freely controlled up to a desired level through a rotation of the sludge supply roller arranged in a structure having a plurality of rows for the left/right side plate and then driven, and the sludge supplied to the electro-penetrative type sludge weight reducing apparatus through the conveyor belt via the sludge supply roller is pressurized to have a uniform height over an entire width of the conveyor belt by means of the thickness adjustor and then uniformly supplied, so that it is possible to induce uniform applying of electricity over the entire surface of the sludge in the electro-penetrative type sludge weight reducing apparatus, and accordingly a moisture content within the sludge may be reduced, which maximizes a moisture reducing efficiency of the sludge.

Furthermore, according to the present invention, since the first and second electrode plates for removing water charged to an electric field by pressurizing horizontally conveyed sludge are manufactured in the unit of an independent module, the manufacture is easy, and a product line having various sludge dehydration processing capabilities through an infinite extension of the independent module may be commercialized. Further, since an insulator surrounding the first and second electrode plates is assembled such that the bolt or the screw fixing the first and second electrode plates is not in contact with iron, it is possible to form a more stable insulation structure and it is easy to perform an assembly operation through a simply assembly using the bolt or the screw. In addition, since the first and second electrode plates are assembled with the bolt or the screw while being surrounded by the insulator, manufacturing costs of the first and second electrode plates are not increased through minimizing the total number of components. Also, since the first and second electrode plates for generating an electric field are formed in the unit of a module, it is possible to inspect and fix the apparatus in the unit of an independent module, which makes an operation convenient and the maintenance economical.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, an exemplary embodiment of the present invention will be described with reference to the accompanying drawings.

Figure 1:
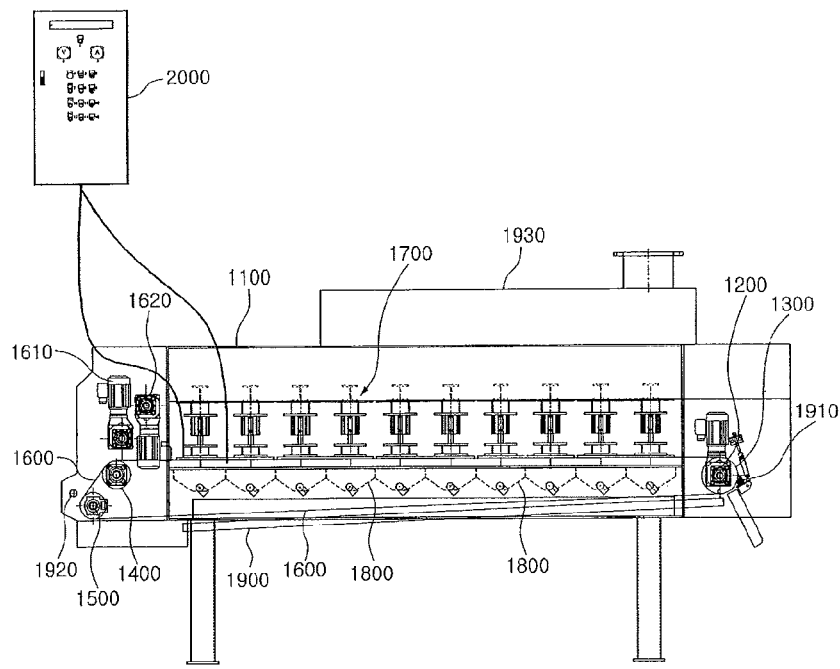
FIG. 1 is a schematic diagram of an electro-penetrative type sludge weight reducing apparatus according to conventional arts.
Figure 2:
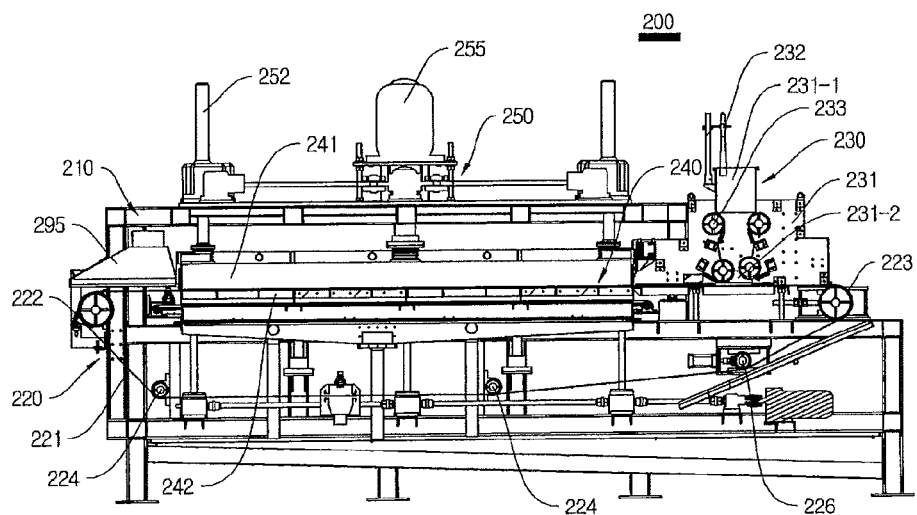
FIG. 2 is a side view of an electro-penetrative sludge weight reducing apparatus according to first and second embodiments of the present invention.
Figure 3:
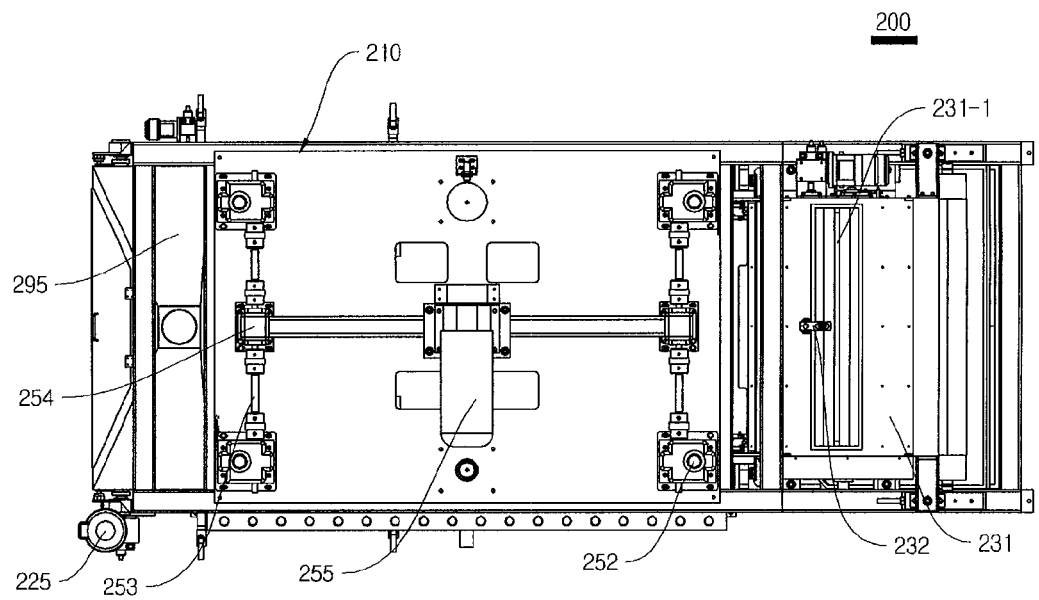
FIG. 3 is a plane view of the electro-penetrative sludge weight reducing apparatus of FIG. 2.
Figure 4:
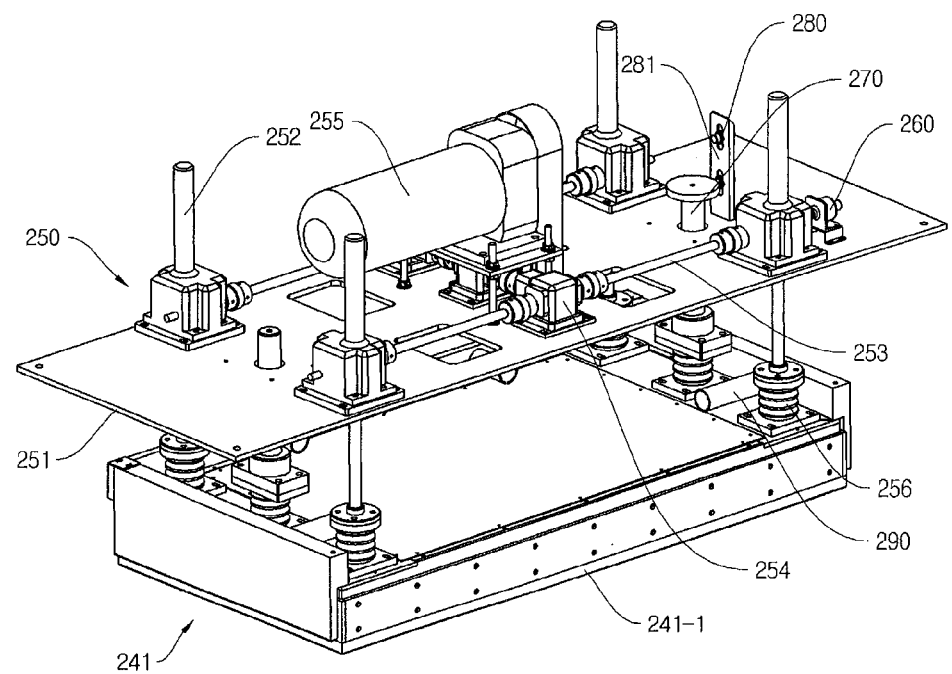
FIG. 4 is a perspective view of a dehydrator and a driver of the electro-penetrative sludge weight reducing apparatus of FIG. 2.
Figure 5:
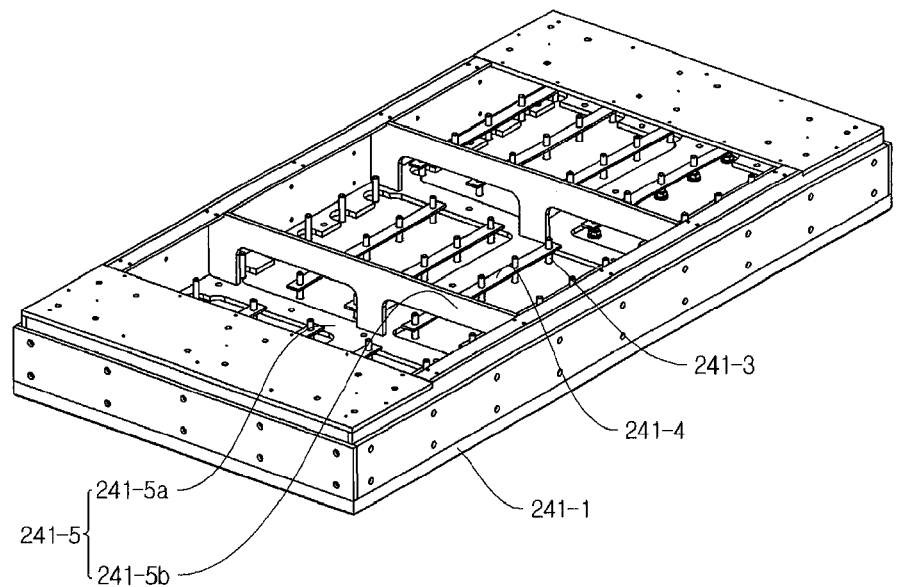
FIG. 5 is a magnified perspective view of the dehydrator of FIG. 4.
Figure 6:
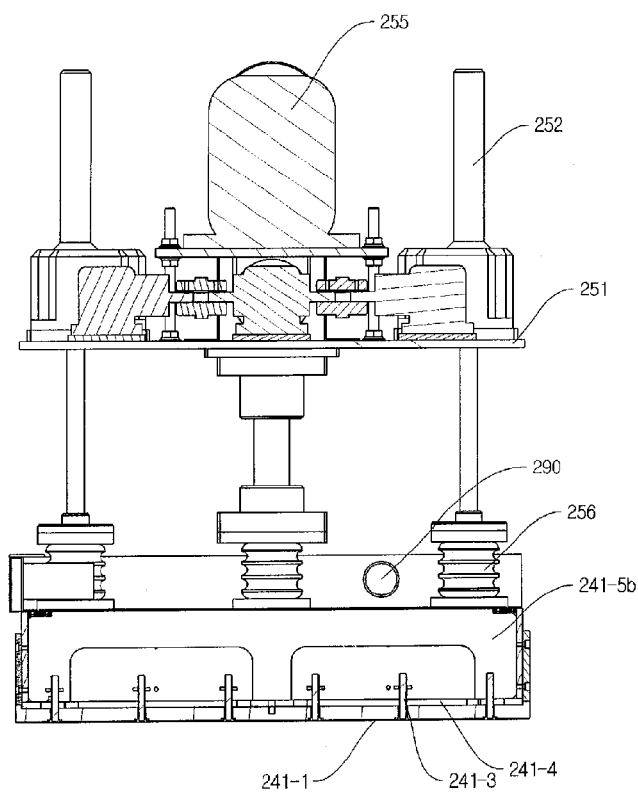
FIG. 6 is a side view of the dehydrator and the driver of the electro-penetrative sludge weight reducing apparatus of FIG. 4.

FIG. 2 is a side view of an electro-penetrative sludge weight reducing apparatus according to first and second embodiments of the present invention, FIG. 3 is a plane view of the electro-penetrative sludge weight reducing apparatus of FIG. 2, FIG. 4 is a perspective view of a dehydrator and a driver of the electro-penetrative sludge weight reducing apparatus of FIG. 2, FIG. 5 is a magnified perspective view of the dehydrator of FIG. 4, and FIG. 6 is a side view of the dehydrator and the driver of the electro-penetrative sludge weight reducing apparatus of FIG. 4.

Referring to FIGS. 2 to 6, the electro-penetrative type sludge weight reducing apparatus 200 according to a first embodiment of the present invention includes a frame 210, a filter cloth conveyor 220, a sludge supplier 230, a dehydrator 240, a driver 250, and a controller.

The frame 210 is made of metallic materials having a predetermined strength and formed to have a hexahedron shape. The frame 210 is formed to have a predetermined shape to support elements, which will be described later, and stably fix the elements to the ground.

The filter cloth conveyor 220 is formed in a lengthwise direction of the frame 210 and infinitely rotates a filter cloth 221. Here, the filter cloth conveyor 220 may include a driving roller 222 formed at a rear end portion of the frame 210, an end roller 223 formed at a front end portion of the frame 210, a guide roller 224 for guiding a transfer of the filter cloth in a direction from the end roller 223 to the driving roller 222, the filter cloth conveying sludge through an infinite rotation of the driving roller 222 and the end roller 223, a driving motor 255 for providing rotation driving force to the driving roller 222 to infinitely rotate the filter cloth 221, and a tension roller 226 for controlling an infinite rotation length of the filter cloth 221 to correspond to strain in a lengthwise direction of the filter cloth 221 according to, for example, seasons, weather, an installation environment, dehydration throughputs of the sludge, or kinds of the sludge. For example, when the filter cloth 221 is extended due to the factors causing the filter cloth to be changed, the filter cloth 221 is not infinitely rotated, so that a position of the tension roller 226 is changed, that is, the tension roller 226 is moved in an opposite direction of the end roller 223 and the filter cloth 221 does not come loose by the sludge.

The sludge supplier 230 is formed at the frame of an upper portion of the filter cloth 221, at which the driving roller 222 and the driving motor 255 are formed, to to supply the sludge having a constant thickness to an upper side of the filter cloth 221. Here, the sludge supplier 230 may include a hopper 231 for supplying the sludge, which is provided by a sludge inlet 231-1 from an outside, to an upper portion of the filter cloth 221 through a sludge outlet 231-2, a sludge supply amount detecting sensor 232 for detecting a supply amount of the sludge supplied to the hopper 231, a sludge supply roller 233 for controlling such that the sludge is uniformly supplied to the upper portion of the filter cloth 221, and a sludge supply roller driving means (not shown) for rotatably driving the sludge supply roller 233. For example, the hopper 231 functions as a storage and a moving path of the sludge, the sludge supply amount detecting sensor 232 performs a function of detecting a supply amount of the sludge stored in or moved to the hopper 231, and the sludge supply roller 233 performs a function of constantly controlling a supply amount of the sludge supplied to the upper portion of the filter cloth 221 according to the sludge supply amount detected by the sludge supply amount detecting sensor 232 to constantly maintain a thickness of the sludge conveyed to the upper portion of the filter cloth 221. That is, the sludge supplier 230 maintains the constant and uniform thickness of the sludge supplied to the upper portion of the filter cloth 221 regardless of a water content amount of the sludge, which may be changed depending on seasons, weather, an installation environment, dehydration throughputs of the sludge, or kinds of the sludge, so that a dehydration efficiency of the sludge through the dehydrator, which will be described later, may be predictable and the dehydration efficiency may be further improved. Meanwhile, referring to FIGS. 15 to 19, the sludge supplier 230 will be described in more detail.

The dehydrator 240 includes a first electrode part 241 formed above the filter cloth 221 and a second electrode part 242 formed under the filter cloth 221 while facing the first electrode. The dehydrator 240 forms an electric field to dehydrate the sludge by compressing the sludge supplied to an upper portion of the filter cloth conveyor 220 by the first and second electrode parts 241 and 242 and applying a voltage to the sludge. That is, the dehydrator 240 dehydrates the sludge by applying substantially the same pressure and voltage within an error range of a compression height of the unit of several mm to entire widths of the sludge supplied to the upper portion of the filter cloth conveyor 220.

Accordingly, it is possible to easily modify a pressure and a voltage applied to the sludge in accordance with characteristics of the sludge changeable according to seasons or an environment and a thickness of the sludge supplied from the sludge supplier 220, to minutely and precisely control the applied pressure in a case of non-biodegradable sludge, and to significantly reduce an installation space, to decrease the number of elevations of the sludge for dehydration and thus reduces a dehydration processing time. As a result, dehydration throughputs may be greatly increased, manufacturing costs and installation costs may be reduced, and an operating method of controlling the sludge dehydration control may become easier.

Referring to FIGS. 4 to 6, the first electrode part 241 may include a first electrode plate 241-1 for applying substantially the same pressure and voltage to the sludge, a voltage terminals 241-3 configured to apply a voltage to the first electrode plate 241-1 and uniformly spaced apart from each other to be arranged in a matrix form, and a conductive member 241-4 for conducting a voltage to the voltage terminal 241-3.

Meanwhile, the first electrode part 241 may further include a reinforcement member 241-5 for reinforcing and supporting the first electrode plate 241-1. That is, the reinforcement member 241-5 includes a horizontal reinforcement part 241-5a formed to have a predetermined shape and substantially parallel to a front surface of the first electrode plate 241-1, and at least two vertical reinforcement parts 541-5b formed to have a predetermined shape and substantially perpendicular to the horizontal reinforcement part 241-5a. The horizontal reinforcement part 541-5a and the vertical reinforcement part 541-5b are firmly coupled to each other. Accordingly, the reinforcement member 541-5 including the horizontal reinforcement part 541-5a and the vertical reinforcement part 541-5b prevents the deformation of the first electrode plate 241-1, for example, the reinforcement member 541-5 effectively prevents distortion in a direction of front, rear, left, or right and deflection of the first electrode plate, to apply substantially the same and uniform pressure and voltage to the front surface of the sludge conveyed to the upper portion of the filter cloth 221.

The driver 250 is fixedly formed on the frame 210 above the dehydrator 240, and elevates the dehydrator 240 in a direction substantially perpendicular to the filter cloth conveyed by the filter cloth conveyor 220.

Referring to FIGS. 4 to 6, the driver 250 includes a fixing plate 241 configured to have a hexahedron shape including a surface having a length and a width corresponding to a front surface of the first electrode plate 241-1 of the first electrode part 241, that is, a length and a width of the first electrode plate 241-1 of the first electrode part 241 and fixedly formed on the frame 210, at least two screw jacks 252 inserted through one side of the fixing plate 251, for example, four corner areas of the fixing plate 251 to be fixedly coupled to one side of the first electrode part 241, interworking shafts 253 for providing rotation force to a pair of screws 252, a gear box 254 for changing a speed of the rotation force provided to each of the interworking shafts 253, and the driving motor 255 for providing rotation force to the gear box 254.

For example, the screw jack 252 may be inserted through four corners of the fixing plate 251 to include four screw jacks 252 fixedly coupled to corresponding four corners of the first electrode part 241. That is, the first electrode part 241 is elevated through rotation of the driving motor 255. More specifically, the driving motor 255 provides rotation force to the gear box 254, the gear box 254 provides the rotation force to each of the interworking shafts 253, and each of the interworking shafts 253 provides the rotation force to the four screw jacks 252, so that the four screw jacks 252 elevate the first electrode part 241 fixedly coupled to the screw jacks 252 in a direction substantially perpendicular to the filter cloth 221 conveyed by the filter cloth conveyor 220. Accordingly, substantially the same pressure may be applied to an entire surface of the sludge through a precise control of the elevation of the first electrode part 241 by the aforementioned four screw jacks 141, which makes a stable and a gradational processing of uniform and constant dehydration for the sludge possible. Here, reference numeral 256 denotes an insulation member for electrically insulating the first electrode part 241 and the screw jack 252, and the insulation member is formed between the first electrode part 241 and the screw jack 252.

The controller (not shown) controls the driver 250, gradually and precisely controls a compression height of the first electrode part 241 of the dehydrator 240 for the sludge to correspond to a dehydration rate of the sludge, and controls an applied voltage for the first and second electrode parts 241 and 242. That is, the controller precisely controls applied pressure and a pressurizing time for the sludge of the first electrode part 241 of the dehydrator 240 by the screw jack 252 of the driver 250 according to characteristic of the sludge and a thickness of the sludge. Further, the controller controls an applied voltage for the first and second electrode parts 241 and 242 of the dehydrator 240, to form an electric field in the sludge and dehydrate the sludge. Here, the controller can remotely control the driver 250 through wireless or wired communication in accordance with a user's convenience.

For example, the controller controls the first electrode part 241 of the dehydrator 240 and gradually descends the first electrode part 241 in a direction perpendicular to the sludge conveyed by the filter cloth conveyor 220 to correspond to a dehydration amount of the sludge, to apply the same pressure and voltage to the sludge.

Meanwhile, a height detector 260 counts and calculates the number of rotations of the interworking shaft 253 or the driving motor 255 to detect a compression height of the first electrode part 241, so that the height detector 260 can detect a compression height of the first electrode part 241 of the dehydrator 240 for the sludge by the driver 250. That is, the controller descends the first electrode part 241 by a preset compression height for the sludge to dehydrate the sludge through an electric field by a voltage applied to the first and second electrode parts 241 and 242, and then gradually re-descends the first electrode part 241 by a preset compression height for the sludge to correspond to the sludge of which volume is reduced by dehydration, to dehydrate the sludge. Here, the controller controls the compression height of the first electrode 241 detected through the height detector 260, and gradually descends the first electrode 241 for the sludge such that the compression height of the first electrode 241 corresponds to a volume of the sludge changed by dehydration. Accordingly, the controller can easily perform a dehydration reaction control according to a dehydration reaction progress of the sludge by gradually descending the first electrode 241 to correspond to the volume of the sludge changed by the dehydration. Further, a water content rate of the sludge is significantly changed since the dehydration becomes different even by a pressurizing error of the unit of several mm of the first electrode part 241 for the sludge. Meanwhile, the height detector 260 can precisely control the screw jack 252 of the driver by the controller, so it is possible to implement a constant dehydration rate by the dehydrator 240.

Meanwhile, the present invention further includes a guide 270 fixedly formed on the first electrode part 241 by being inserted through the fixing plate 251 and an elevation limit detector 280 for detecting an elevation limit of the guide 270 according to the elevation of the first electrode part 241 of the dehydrator 240 by the driver 250.

Here, the elevation limit detector 280 detects each of a limited elevation height and a limited descent height of the first electrode part 241 such that the first electrode part 241 of the dehydrator 240 maintains a proper compression height for the sludge. That is, the elevation limit detector 280 detects the limited elevation height of the first electrode part 241 to prevent malfunction or damage of the screw jack 252, and detects the limited descent height of the first electrode part 241 to prevent compression force more than a limited value from being applied to the sludge. For example, when the limited elevation height of the first electrode part 241 is detected by the elevation limit detector 280, the controller forcibly stops the driver 250 to effectively prevent malfunction or damage of the screw jack 252, or effectively prevent compression force more than a limited value from being applied to the sludge. Accordingly, loads of sludge supplied to the sludge supplier 230 by the controller, for example, a limited elevation height of the elevation limit detector 280 according to characteristics and a thickness of the sludge is preset, so that a dehydration rate of the sludge may be uniformly and constantly maintained although the loads of the sludge supplied to the sludge supplier 230, for example, the characteristics and the thickness of the sludge are changed. Here, reference numeral 281 refers to an elevation limit detector frame 281, which is fixedly formed on the fixing plate 251 in an elevation direction of the guide 270 and to which the elevation limit detector 280 is mounted.

Meanwhile, referring to FIGS. 4 to 6, an exhaust pipe 290 is fixedly formed on a side surface of the first electrode part 241, and discharges wet steam generated from the sludge gradually dehydrated by the dehydrator 240 to an outside.

Further, referring to FIGS. 2 and 3, a ventilator 295 is fixedly formed on the frame 210 such that the ventilator 295 is located in an opposite side of the filter cloth conveyor 220, for example, a position to face the sludge supplier 230 and supplies wet steam generated from the sludge in which the dehydration is completed by the dehydrator 240. That is, the exhaust pipe 290 and the ventilator 295 supply the wet stream generated from the sludge to discharge the wet stream to an outside, so that it is possible to effectively prevent each element included in the electro-penetrative type sludge weight reducing apparatus 200 according to the embodiments from being corroded.

Meanwhile, referring to FIGS. 2 to 6, the electro-penetrative type sludge weight reducing apparatus 200 according to a second embodiment of the present invention includes the frame 210, the filter cloth conveyor 220, the sludge supplier 230, the dehydrator 240, the driver 250, and the controller.

The frame 210 is made of metallic materials having a predetermined strength and formed to have a hexahedron shape. The frame 210 is formed to have a predetermined shape to support elements, which will be described later, and stably fix the elements to the ground.

The filter cloth conveyor 220 is formed in a lengthwise direction of the frame 210 and infinitely rotates a filter cloth 221. Here, the filter cloth conveyor 220 may include a driving roller 222 formed at a rear end portion of the frame 210, an end roller 223 formed at a front end portion of the frame 210, a guide roller 224 for guiding a transfer of the filter cloth in a direction from the driving roller 222 to the end roller 223, the filter cloth conveying sludge through an infinite rotation of the driving roller 222 and the end roller 223, a driving motor 255 for providing rotation driving force to the driving roller 222 to infinitely rotate the filter cloth 221, and a tension roller 226 for controlling an infinite rotation length of the filter cloth 221 to correspond to strain in a lengthwise direction of the filter cloth 221 according to, for example, seasons, weather, an installation environment, dehydration throughputs of the sludge, or kinds of the sludge. For example, when the filter cloth 221 is extended due to the factors causing the filter cloth to be changed, the filter cloth 221 is not infinitely rotated, so that a position of the tension roller 226 is changed, that is, the tension roller 226 is moved in an opposite direction of the end roller 223 and the filter cloth 221 does not come loose by the sludge.

The sludge supplier 230 is formed at the frame of an upper portion of the filter cloth 221, at which the driving roller 222 and the driving motor 255 are formed, to supply the sludge having a constant thickness to an upper side of the filter cloth 221. Here, the sludge supplier 230 may include a hopper 231 for supplying the sludge, which is provided by a sludge inlet 231-1 from an outside, to an upper portion of the filter cloth 221 through a sludge outlet 231-2, a sludge supply amount detecting sensor 232 for detecting a supply amount of the sludge supplied to the hopper 231, a sludge supply roller 233 for controlling such that the sludge is uniformly supplied to the upper portion of the filter cloth 221, and a sludge supply roller driving means (not shown) for rotation-driving the sludge supply roller 233. For example, the hopper 231 functions as a storage and a moving path of the sludge, the sludge supply amount detecting sensor 232 performs a function of detecting a supply amount of the sludge stored in or moved to the hopper 231, and the sludge supply roller 233 performs a function of constantly controlling a supply amount of the sludge supplied to the upper portion of the filter cloth 221 according to the sludge supply amount detected by the sludge supply amount detecting sensor 232 to constantly maintain a thickness of the sludge conveyed to the upper portion of the filter cloth 221. That is, the sludge supplier 230 maintains the constant and uniform thickness of the sludge supplied to the upper portion of the filter cloth 221 regardless of a water content amount of the sludge, which may be changed depending on seasons, weather, an installation environment, dehydration throughputs of the sludge, or kinds of the sludge, so that a dehydration efficiency of the sludge through the dehydrator, which will be described later, may be predictable and the dehydration efficiency may be further improved. Meanwhile, referring to FIGS. 15 to 19, the sludge supplier 230 will be described in more detail.

The dehydrator 240 includes a first electrode part 241 formed at an upper part of the filter cloth 221 and a second electrode part 242 formed at a lower part of the filter cloth 221 while facing the first electrode. The dehydrator 240 forms an electric field to dehydrate the sludge by compressing the sludge supplied to an upper portion of the filter cloth conveyor 220 by the first and second electrode parts 241 and 242 and applying a voltage. That is, the dehydrator 240 dehydrates the sludge by applying substantially the same pressure and voltage within an error range of a compression height of the unit of several mm to entire widths of the sludge supplied to the upper portion of the filter cloth conveyor 220. Accordingly, it is possible to easily modify a pressure and a voltage applied to the sludge in accordance with characteristics of the sludge changeable according to seasons or an environment and a thickness of the sludge supplied from the sludge supplier 220, to minutely and precisely control the applied pressure in a case of non-biodegradable sludge, to significantly reduce an installation space, to decrease the number of elevations of the sludge for dehydration and thus reduce a dehydration processing time. As a result, dehydration throughputs may be greatly increased, manufacturing costs and installation costs may be reduced, and an operating method of controlling the sludge dehydration control may become easier.

More specifically, the first electrode part 241 may include a first electrode plate 241-1 for applying substantially the same pressure and voltage to the sludge, a voltage terminals 241-3 for applying a voltage to the first electrode plate 241-1 and being uniformly spaced apart from each other to be arranged in a matrix form, and a conductive member 241-4 for conducting a voltage to the voltage terminal 241-3.

Meanwhile, the first electrode part 241 may further include a reinforcement member 241-5 for reinforcing and supporting the first electrode plate 241-1. That is, the reinforcement member 241-5 includes a horizontal reinforcement part 241-5a formed to have a predetermined shape and substantially parallel to a front surface of the first electrode plate 241-1, at least two vertical reinforcement parts 541-5b formed to have a predetermined shape and substantially perpendicular to the horizontal reinforcement part 241-5a. The horizontal reinforcement part 541-5a and the vertical reinforcement part 541-5b are firmly coupled to each other. Accordingly, the reinforcement member 541-5 including the horizontal reinforcement part 541-5a and the vertical reinforcement part 541-5b prevents the deformation of the first electrode plate 241-1, for example, the reinforcement member 541-5 effectively prevents distortion in a direction of front, rear, left, and right and deflection of the first electrode plate, to apply substantially the same and uniform pressure and voltage to the front surface of the sludge conveyed to the upper portion of the filter cloth 221.

The driver 250 is fixedly formed on the frame 210 on the dehydrator 240, and elevates the dehydrator 240 in a direction substantially perpendicular to the filter cloth conveyed by the filter cloth conveyor 220.

The driver 250 includes a fixing plate 241 configured to have a hexahedron shape including a surface having a length and a width corresponding to a front surface of the first electrode plate 241-1 of the first electrode part 241, that is, a length and a width of the first electrode plate 241-1 of the first electrode part 241 and fixedly formed on the frame 210 and fixedly formed on the frame 210, at least two screw jacks 252 inserted through one side of the fixing plate 251, for example, four corner areas of the fixing plate 251 to be fixedly coupled to one side of the first electrode part 241, an interworking shaft 253 for providing rotation force to a pair of screws 252, a gear box 254 for changing a speed of the rotation force provided to each of the interworking shaft 253, and the driving motor 255 for providing rotation force to the gear box 254.

For example, the screw jack 252 may be inserted through four corners of the fixing plate 251 to include four screw jacks 252 fixedly coupled to corresponding four corners of the first electrode park 241. That is, the first electrode part 241 is elevated through rotation of the driving motor 255. More specifically, the driving motor 255 provides rotation force to the gear box 254, the gear box 254 provides rotation force to each of the interworking shafts 253, and each of the interworking shafts 253 provides rotation force to the four screw jacks 252, so that the four screw jacks 252 elevates the first electrode part 241 fixedly coupled to the screw jacks 252 in a direction substantially perpendicular to the filter cloth conveyed by the filter cloth conveyor 220. Accordingly, substantially the same pressure may be applied to an entire surface of the sludge through a precise control of the elevation of the first electrode part 241 by the aforementioned four screw jacks 141, which makes a stable and a gradational processing of uniform and constant dehydration for the sludge possible. Here, reference numeral 256 denotes an insulation member for electrically insulating the first electrode part 241 and the screw jack 252, and the insulation member is formed between the first electrode part 241 and the screw jack 252.

The controller (not shown) controls the driver 250, gradually and precisely controls a compression height of the first electrode part 241 of the dehydrator 240 for the sludge to correspond to a dehydration rate of the sludge, and controls an applied voltage for the first and second electrode parts 241 and 242. That is, the controller precisely controls applied pressure and a pressurizing time for the sludge of the first electrode part 241 of the dehydrator 240 by the screw jack 252 of the driver 250 according to characteristic of the sludge and a thickness of the sludge. Further, the controller controls an applied voltage for the first and second electrode parts 241 and 242 of the dehydrator 240, to form an electric field in the sludge and dehydrate the sludge. Here, the controller can remotely control the driver 250 through wireless or wired communication in accordance with a user's convenience.

For example, the controller controls the first electrode part 241 of the dehydrator 240 and gradually descends the first electrode part 241 in a direction perpendicular to the sludge conveyed by the filter cloth conveyor 220 to correspond to a dehydration amount of the sludge, to apply the same pressure and voltage.

Meanwhile, a height detector 260 counts and calculates the number of rotations of the interworking shaft 253 or the driving motor 255 to detect a compression height of the first electrode part 241, so that the height detector 260 can detect a compression height of the first electrode part 241 of the dehydrator 240 for the sludge by the driver 250. That is, the controller descends the first electrode part 241 by a preset compression height for the sludge to dehydrate the sludge through an electric field by a voltage applied to the first and second electrode parts 241 and 242, and then gradually redescends the first electrode part 241 by a preset compression height for the sludge to correspond to the sludge of which volume is reduced by dehydration, to dehydrate the sludge. Here, the controller controls the compression height of the first electrode 241 detected through the height detector 260, and gradually descends the first electrode 241 for the sludge such that the compression height of the first electrode 241 corresponds to volume of the sludge changed by dehydration. Accordingly, the controller can easily perform a dehydration reaction control according to a dehydration reaction progress of the sludge by gradually descending the first electrode 241 to correspond to the volume of the sludge changed by the dehydration. Further, a water content rate of the sludge is significantly changed since the dehydration becomes different even by a pressurizing error of the unit of several mm of the first electrode part 241 for the sludge. Meanwhile, the height detector 260 can precisely control the screw jack 252 of the driver by the controller, so it is possible to implement a constant dehydration rate by the dehydrator 240.

Meanwhile, the present invention further includes a guide 270 fixedly formed at the first electrode part 241 by being inserted through the fixing plate 251 and an elevation limit detector 280 for detecting an elevation limit of the guide 270 according to the elevation of the first electrode part 241 of the dehydrator 240 by the driver 250.

Here, the elevation limit detector 280 detects each of a limited elevation height and a limited descent height of the first electrode part 241 such that the first electrode part 241 of the dehydrator 240 maintains a proper compression height for the sludge. That is, the elevation limit detector 280 detects the limited elevation height of the first electrode part 241 to prevent malfunction or damage of the screw jack 252, and detects the limited descent height of the first electrode part 241 to prevent that compression force more than a limitation value is applied to the sludge. For example, when the limited elevation height of the first electrode part 241 is detected by the elevation limit detector 280, the controller forcibly stops the driver 250 to effectively prevent malfunction or damage of the screw jack 252, or effectively prevent that compression force more than a limitation value is applied to the sludge. Accordingly, loads of sludge supplied to the sludge supplier 230 by the controller, for example, a limited elevation height of the elevation limit detector 280 according to characteristics and a thickness of the sludge is preset, so that a dehydration rate of the sludge may be uniformly and constantly maintained although the loads of the sludge supplied to the sludge supplier 230, for example, the characteristics and the thickness of the sludge are changed. Here, reference numeral 281 refers to an elevation limit detector frame 281, which is fixedly formed on the fixing plate 251 in an elevation direction of the guide 270 and to which the elevation limit detector 280 is mounted.

Meanwhile, the exhaust pipe 290 is fixedly formed on a side surface of the first electrode part 241, and discharges wet steam generated from the sludge gradually dehydrated by the dehydrator 240 to an outside. Further, the ventilator 295 is fixedly formed on the frame 210 such that the ventilator 295 is located in an opposite side of the filter cloth conveyor 220, for example, a position to face the sludge supplier 230 and supplies wet steam generated from the sludge in which the dehydration is completed by the dehydrator 240. That is, the exhaust pipe 290 and the ventilator 295 supply the wet stream generated from the sludge to discharge the wet stream to an outside, so that it is possible to effectively prevent each element included in the electro-penetrative type sludge weight reducing apparatus 200 according to the embodiments from being corroded.

Figure 7:
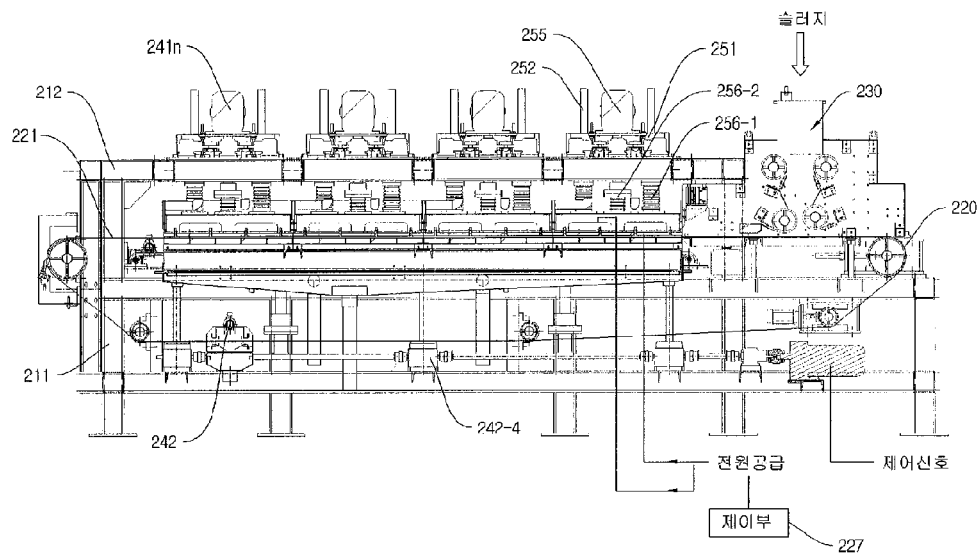
FIG. 7 is a diagram of an electro-penetrative sludge weight reducing apparatus according to another exemplary embodiment of the present invention.

FIG. 7 is a diagram of an electro-penetrative sludge weight reducing apparatus according to another exemplary embodiment of the present invention.

Specifically, the electro-penetrative type sludge weight reducing apparatus includes a lower frame 211 configured to couple a plurality of frames, an upper frame 212 installed above the lower frame 211 to have a space in which the filter cloth 221 for conveying sludge while being wound around a plurality of rollers to rotate with an infinite orbit is arranged, the filter cloth conveyor 220, which is a power source for driving the filter cloth 221 on which the sludge discharged from the sludge supplier 230 is laid, and the dehydrator for pressurizing the sludge and applying an electric field to discharge water from the sludge. Further, the electro-penetrative type sludge weight reducing apparatus further includes the hopper for collecting discharged sewage to a lower portion of the apparatus, the sludge outlet for discharging the collected sewage to one side, and the exhaust pipe and the ventilator for discharging a gas generated in dehydration of the sludge. Furthermore, the electro-penetrative type sludge weight reducing apparatus further includes a scrapper for removing a cake from the filter cloth 221 after dehydration, and a washing nozzle for washing the filter cloth 221.

Meanwhile, the sludge supplier 230 is mounted to and formed at one side surface of the lower frame 211, and the filter cloth conveyor 220 includes a decelerator, a driving motor generating rotating power under a control of the controller 227, the driving roller rotating through the driving motor, a plurality of guide rollers wound by the filter cloth 221 such that the filter cloth has an infinite orbit, and the end roller, to be mounted to one side surface of the lower frame 211.

Meanwhile, the dehydrator includes the first electrode part 241 forming a positive (+) electrode with a voltage supplied through the controller 227 and the second electrode part 242 forming a negative (−) electrode. The first electrode part 241 includes a plurality of first electrode modules 241n moving upwardly and downwardly from an upper side portion of the upper frame 212 to pressurize the sludge conveyed through the filter cloth 221 and the second electrode part 242 includes a second electrode plate 242-1 for adjusting a close position for the filter cloth 221 by using a height adjusting means 242-4 installed in the lower frame 211 and forming a negative (−) electrode by a voltage supplied through the controller 227 to charge moisture included in the sludge.

The first and second electrode parts 241 and 242 of the dehydrator are combined and formed in the unit of an individual module occupying a predetermined width of the filter cloth 221 to be arranged along a total length of the filter cloth 221, and form an electric field for an entire section of the filter cloth 221 due to the connection of certain sections with each other.

For example, the first electrode modules 241n are formed in the unit of a module having a size to occupy a predetermined width of the filter cloth 221 for a total length of the filter cloth 221, and closely arrange the first electrode modules 241n to each other to correspond to a length of the filter cloth 221. Meanwhile, the second electrode plate 242-1 of the second electrode part 242 facing the first electrode modules 241n is constructed in the unit of an individual module to correspond to sizes of the first electrode modules 241n of the first electrode part 241.

Figure 8:
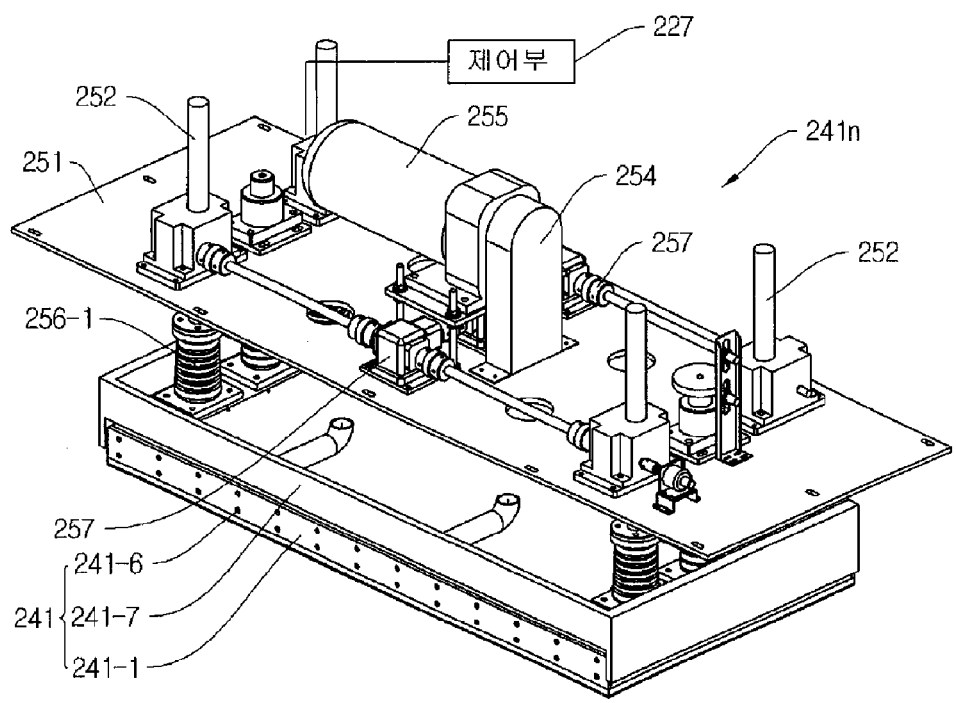
FIG. 8 is a diagram of an upper electrode unit of an independent module unit according to the present invention.

Specifically, as shown in FIG. 8, the first electrode modules 241n include the driving motor 255 driven by a control of the controller 227, the driver for converting rotation of the driving motor 255 to upward and downward movements, and the first electrode part 241 for receiving moving force in a downward direction of the driver to pressurize the sludge laid on the filter cloth 221 and forming an electric field with a supplied voltage.

Meanwhile, the driver includes the gear box 254 for receiving rotation of the driving motor 255 to convert the rotation to a vertical straight line direction, and the gear box 254 couples a rack rotated through the driving motor 255 to a pinion in such a manner that the rack is in a erect state, so that a method of converting rotation of the pinion to vertically upward and downward movements of the rack may be applied.

Further, the driver further includes a pressurizing member 257, a plate-shaped fixing plate 251 for receiving power through the pressurizing member 257 to move, the screw jack 251 for allowing the fixing plate to be located in its position and guiding a movement of the fixing plate, and the insulation member 256-1 provided to the screw jack 252.

Furthermore, the pressurizing member 257 includes an extended long rod to transfer power to a corner rising part of the fixing plate 251 since the gear box 254 is located in the center of the fixing plate 251 and an end of the rod has a structure connecting a block penetrating the screw jack 252.

Moreover, a pair of pressurizing members 257 are arranged on both sides of the gear box 254 to uniformly distribute power pressurized to the fixing plate 251, and each of the screw jacks 252 are formed in a corner portion of the fixing plate 251. Further, the insulation members 256-2 installed in the fixing plate 251 are formed on both sides of the fixing plate 251.

Figure 9:
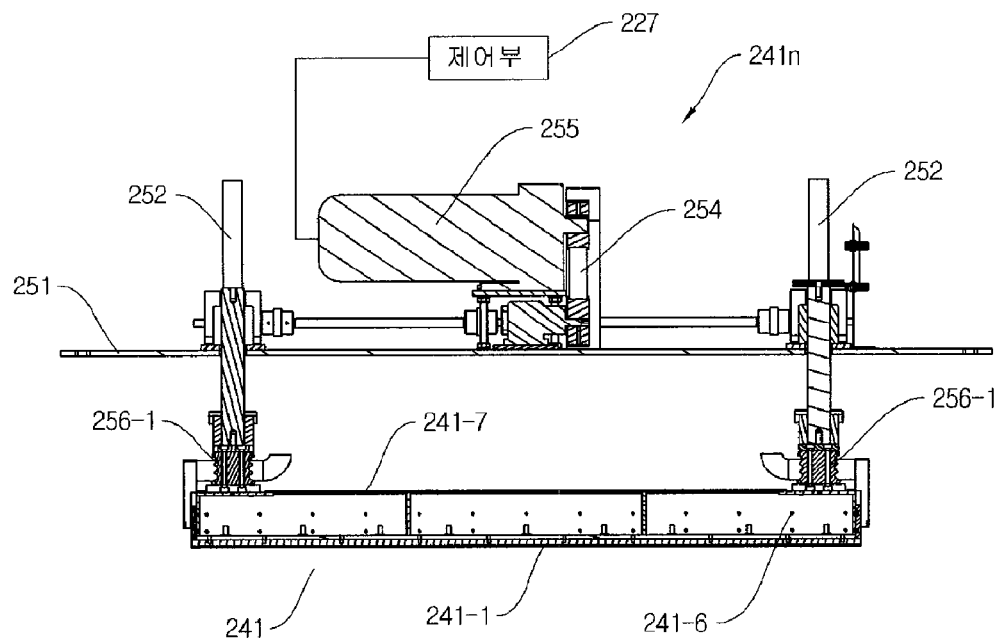
FIGS. 9 to 11 are diagrams of an upper electrode plate according to the present invention.

As shown in FIG. 9, when the fixing plate 251 of the first electrode part 241 compresses the insulation member 256-1 and moves in a downward direction while being in a state where the fixing plate 251 is coupled with the screw jack 252, sludge laid on the filter cloth is pressurized by an applied pressure of the fixing plate 251. Specifically, the first electrode part 241 includes the first electrode plate 241-1 receiving an voltage through the controller to form a positive (+) electrode, an insulation member 241-6 having an insulation structure for the first electrode plate 241-1, and a mounting frame 241-7 fixed with the insulation member 241-6 and having rigidity. Further, the first electrode plate 241-1 includes a plurality of welding fixed power terminals 241-1a, and a plurality of fixation holes 241-1b tap processed such that a fixing member 241-9, which is the screw, is coupled. Here, the fixation hole 241-1b tightens fixation of the first electrode plate 241-1 to the insulation member 241-6, so that a plurality of fixation holes are processed in an upper portion of a corner part of the first electrode plate 241-1, but a plurality of power terminals 241-1a are located in an internal space of the first electrode plate 241-1 with uniform distribution.

Further, the power terminal 241-1a includes a welding bolt 241-1a1 welded to the first electrode plate 241-1, a nut 241-1a2 coupled to the welding bolt 241-1a1, and a seal 241-1a3 patched on a position where the nut 241-1a2 is located. The insulation member 241-6 includes a base plate 241-6a and a side wall plate 241-6b for forming an edge having a predetermined width and height, to form a space part 241-6c in which the power terminal 241-1a welded to the first electrode plate 241-1 inwardly protrudes. The space part 241-6c is partitioned by partition walls having the same width and height as those of the side wall plate 241-6b to be divided into a plurality of spaces.

Tap holes which the power terminal 241-1a penetrates are precisely processed in the base plate 241-6a, another tap hole is processed to be spaced away from one tap hole, and tap holes, in which a plurality of fixing members 241-8 are inserted, are also formed in the side wall plate 241-6b. Here, the fixing member 241-8 may be a bolt or a screw.

The mounting frame 241-7 includes a frame body 241-7a forming an empty space and having a predetermined thickness, and a rigid body 241-7b crossing the center of a width of the frame body 241-7a to strengthen the rigidity. Further, a plurality of holes are formed in a side surface of the frame body 241-7a and the fixing member 241-8, which is coupled with the insulation member 241-6, is assembled with the holes formed in the frame body, so that the mounting frame 241-7 and the insulation member 241-6 fix each other. Further, since the mounting frame 241-7 has a size to be inserted in an internal space of the insulation member 241-6, the mounting frame 241-7 made of an iron material is not separated from the insulation member 241-6.

As described above, a bolt or a screw-coupling is performed in a set position when the first electrode plate 241-1, the insulation member 241-6, and the mounting frame 241-7 are assembled, so that it is possible to simply implement an assembly process, and further strengthen insulation safety for the mounting frame 241-7 made of metallic materials because a process, in which the first electrode plate 241-1 is patched on the insulation member 241-6 and the insulation member 241-6 is coupled to the mounting frame 241-7, is applied.

Figure 10:
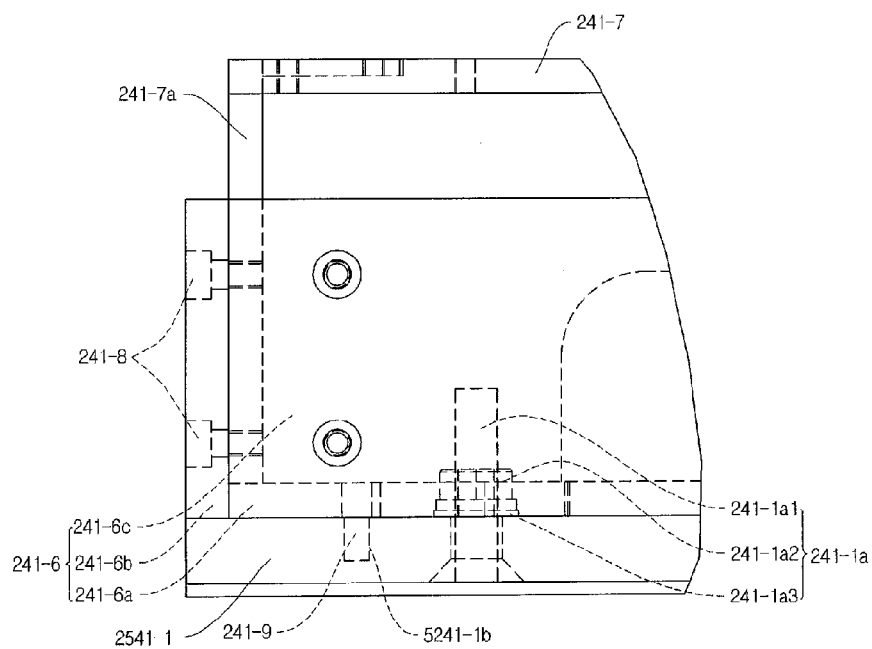

As shown in FIG. 10, a plurality of power terminals 241-1a are fixed to set positions of the first electrode plate 241-1 through welding, and then the first electrode plate 241-1 and the insulation member 241-6 are assembled.

The assembly between the first electrode plate 241-1 and the insulation member 241-6 is performed through a process in which the welding bolt 241-1*a*1 welded to the first electrode plate 241-1 is inserted in a hole of the base plate 241-6*a* of the insulation member 241-6, the nut 241-1*a*2 is coupled such that the insulation member 241-6 is in contact with the first electrode plate 241-1, and then the seal 241-1*a*3 is coupled to a position where the nut 241-1*a*2 is located.

The screw, which is the fixing member 241-9, is coupled from the insulation member 241-6 to the first electrode plate 241-1.

As described above, the present invention has convenience in that the assembly is implemented through a simple process in which the first electrode plate 241-1 is arranged in a position set for a lower surface of the insulation member 241-6, and then the nut 241-1*a*2 and the screw, which is the fixing member 241-9, are inserted in the processed holes.

Next, the mounting frame 241-7 mounted to an upper surface of the insulation member 241-6 is made of steel materials affecting the insulation performance, but the stable insulation performance is secured through an application of an assembly structure implemented in the embodiments of the present invention. After the coupling, the mounting frame 241-7 is inserted in the side wall plate 241-6*b* forming an edge of the insulation member 241-6 and is in contact with an inner surface of the side wall plate 241-6*b*, so that the mounting frame 241-7 has a structure in which the mounting frame 241-7 is surrounded by the insulation member 241-6.

Meanwhile, after the side wall plate 241-6*b*, which is the edge of the insulation member 241-6, surrounds an edge portion of the frame body 241-7*a* of the mounting frame 241-7, the bolt or the screw, which is the fixing member 241-8, is coupled from the base plate 241-6*a* to the frame body 247-*a*, so that an assembly between the insulation 241-6 and the mounting frame 241-7 is completed.

Figure 11:
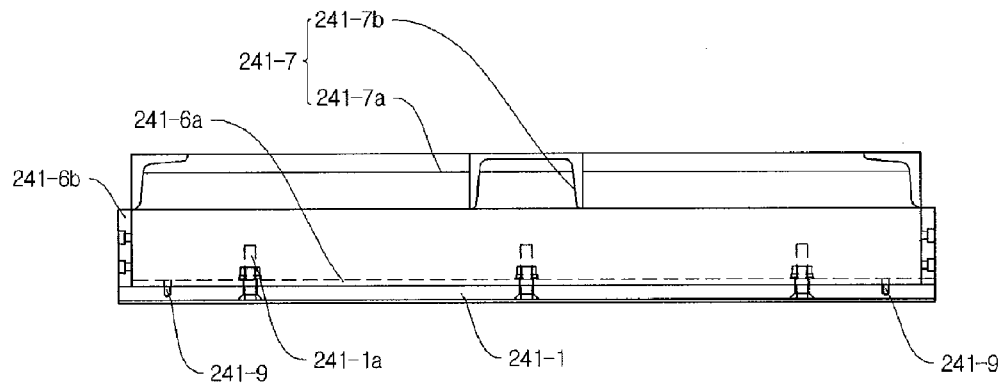

Meanwhile, as shown in FIG. 11, in the embodiments of the present invention, the first electrode part 241 may be assembled through an extremely simple method of coupling the bolt or the screw using set positions where the first electrode plate 241-1, the insulation member 241-6, and the mounting frame 241-7 are located, and particularly, since the mounting frame 241-7 made of steel materials is inserted in an inner space of the insulation member 241-6 to have a surrounded state, the insulation may be stably secured. Here, the second electrode part 242 is installed on a lower frame 211 such that the second electrode part 242 is located under the filter cloth 221 conveying the sludge and is coupled with the height adjusting means 242-4 in order to adjust a height for the filter cloth 221. Meanwhile, the height adjusting means 242-4 uses a method of converting a rotation of the motor controlled by the controller 227 to a vertically elevating/descending movement by using the pinion and the rack, or implements a method of providing a vertically elevating/descending movement by using an oil pressure or an air pressure as shown in FIG. 7. Further, the height adjusting means 242-4 is configured to totally elevate and descend the second electrode part 242.

Figure 12:
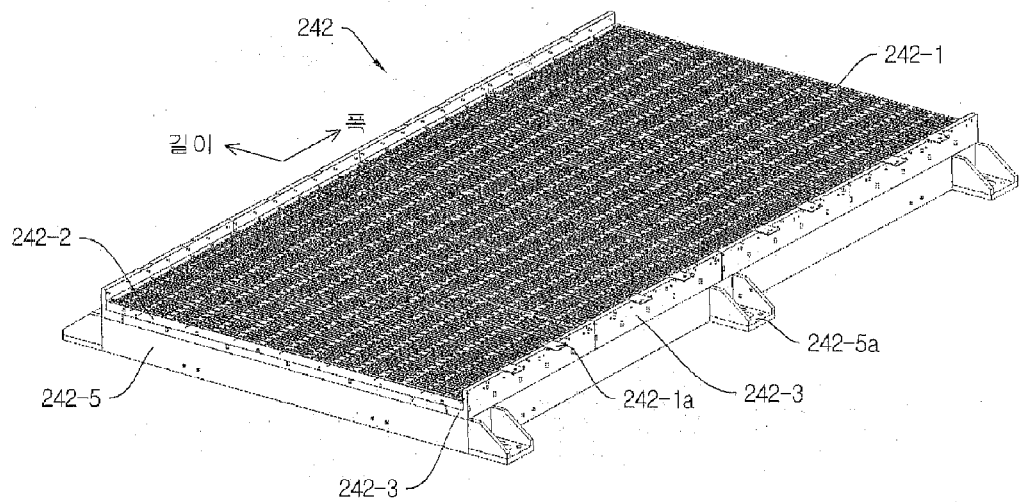
FIGS. 12 to 14 are diagrams of a lower electrode plate according to the present invention.

As shown in FIG. 12, the second electrode part 242 includes a plurality of second electrode plates 242-1 independently receiving power, a support 242-2 individually surrounding the second electrode plates 242-1, an insulation member 242-3 surrounding the plurality of second electrode plates 242-1 closely arranged to each other for insulation, and a steel material support frame 242-5 configured to fix the insulation member 242-3 and coupled with the height adjusting means 242-4.

The second electrode plates 242-1 receive power through the controller 227 and include at least one power terminal 242-1*a* forming a negative (−) electrode, and each of the second electrode plates 242-1 have an identical size to that of the first electrode plate 241-1.

The support 242-2 has a structure in which the support 242-2 surrounds the second electrode plate 242-1 in a lengthwise direction while maintaining an upper surface of the second electrode plate 242-1 opened, and is fixed to the insulation member 242-3 by the fixing member 242-2*a*, which is the screw.

Figure 13:
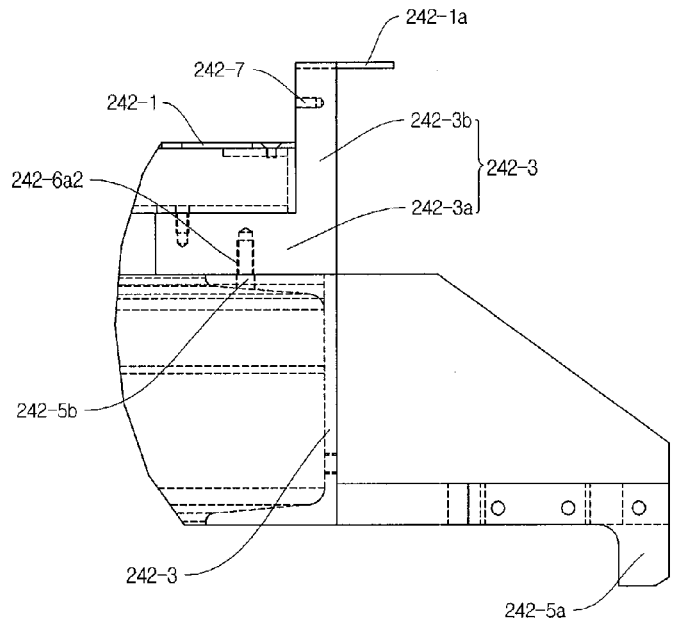

Meanwhile, as shown in FIG. 13, the insulation member 242-3 includes a side wall plate 242-3*b* configured to form a base plate 242-3*a*, on which a bottom surface of the second electrode plate 242-1 is laid, and bent to have a predetermined height to form a side surface of the base plate 242-3*a*, which surrounds a widthwise side surface of the second electrode plate 242-1.

The insulation member 242-3 may be manufactured such that the base plate 242-3*a* is integrally connected to both side wall plates 242-3*b*, but it is preferable that the base plate 242-3*a* is extended from both side wall plates 242-3*b* to have a predetermined length and a pair of side wall plates located in both sides are formed in assembly.

Further, a plurality of tap processed fixation holes 242-6*a*1, 242-6*a*2, and 242-6*b*1 are formed in the base plate 242-3*a* and the side wall plate 242-3*b* of the insulation member 242-3. For example, the fixation hole 242-6*a*1 having a predetermined depth is processed in a top surface of the base plate 242-3*a* and the fixation hole 242-6*a*2 having a predetermined depth is processed in a bottom surface, which is an opposite surface of the top surface, of the base plate 242-3*a*, and the fixation hole 242-6*b*1 having a predetermined depth is processed in an inner surface of the side wall plate 242-3*b*. Here, the fixation holes 242-6*a*1, 242-6*a*2, and 242-6*b*1 have a depth not to penetrate thicknesses of the base plate 242-3*a* and the side wall plate 242-3*b*, so that the fixing members 242-2*a*, 242-5*b*, and 242-7, which are the bolt or the screw, do not stick out to an outside after each of the fixing members is coupled.

Furthermore, the support frame includes an upper surface and a side surface having a predetermined thickness and an opened bottom surface, and forms a plurality of coupling ends 242-5*a* for coupling with another component. Further, a plurality of tap processed holes for forming fixation force by the bolt or the screw penetrating the insulation member 242-3 are formed in the upper surface of the support frame 242-5. Meanwhile, the coupling ends 242-5*a* are formed in four corners of the support frame 242-5 and each of the coupling ends is formed at the center of a long side surface portion connecting two corners.

As described above, it is possible to simply implement an assembly process because the bolt or the screw is coupled in a position set when the second electrode 242-1 and the support frame 242-2, and the insulation member 242-3 and the support frame 242-5 are assembled, and it is possible to further strengthen the insulation safety for iron materials such as the support frame 242-5 because the fixing members 242-2*a*, 242-5*b*, and 242-7 coupled to the insulation member 242-3 located between the second electrode plate 242-1 and the support frame 242-5 are not separated from the insulation member 242-3.

As shown in FIG. 13, a position of each of processed fixation holes 242-6*a*2 of the support frame 242-5 and the insulation member 242-3 is adjusted, the fixing member 242-5*b*, which is the bolt or the screw, is inserted from the support frame 242-5 to the insulation member 242-3, and then the support frame 242-5 and the insulation member 242-3 are assembled.

In the aforementioned assembly structure, the fixation hole 242-6a2 of the insulation member 242-3 does not penetrate the insulation member 242-3, so that a contact between the second electrode plate 242-1 and the fixing member 242-5b is prevented, and accordingly, a more stable insulation structure may be secured through preventing iron of the second electrode plate 242-1 from being contacted. Here, the support 242-2 is assembled to the insulation member 242-3 in a state where the support frame 242-5 and the insulation member 242-3 are fully assembled. That is, the support 242-2 is laid on the base plate 242-3a of the insulation member 242-3 to correspond to the fixation hole 242-6a1 located in the base plate 242-3a, and then the fixing member 242-2a, which is the bolt or the screw, is coupled from the hole located in the support 242-2 to the fixation hole 242-6a1 located in the insulation member 242-3 to assemble the insulation member 242-3 and the support 242-2.

Meanwhile, it is possible to secure a more stable insulation structure by preventing the second electrode plate 242-1 from being contacted with the iron through the fixing member 242-2a because the fixation hole 242-6a1 of the insulation member 242-3 does not penetrate the insulation member 242-3. Further, the support 242-2 fixes only one lower end electrode plate among a plurality of second electrode plates 242-1, so that the support 242-2 is assembled to correspond to the number of arranged second electrode plates 242-1. Further, when the insulation member 242-3 is assembled to the support frame 242-5 and the support 242-2 is assembled to the insulation member 242-3, the second electrode plate 242-1 is assembled and the power terminal 242-1a, to which power is supplied, when the second electrode plate 242-1 is assembled.

Figure 14:
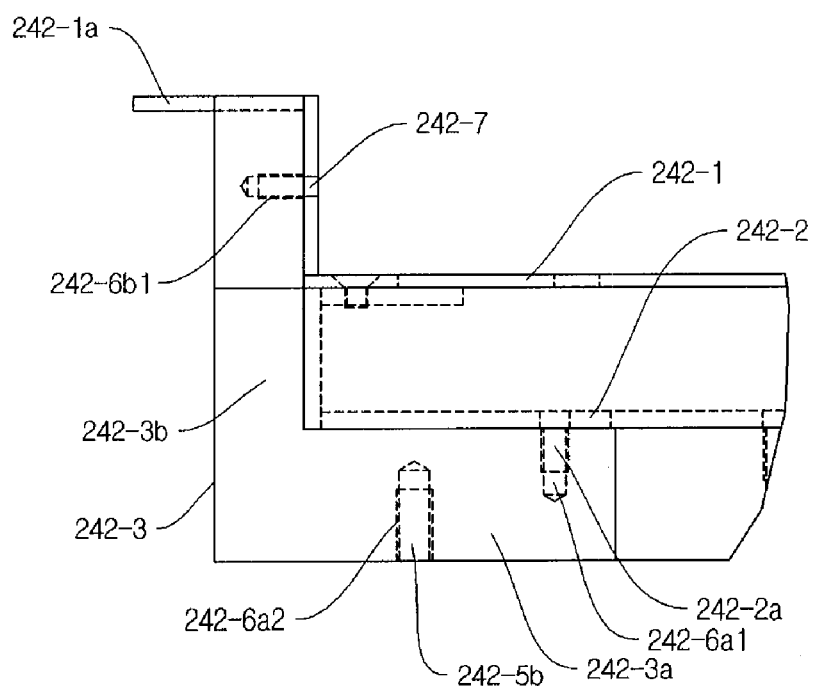
Figure 15:
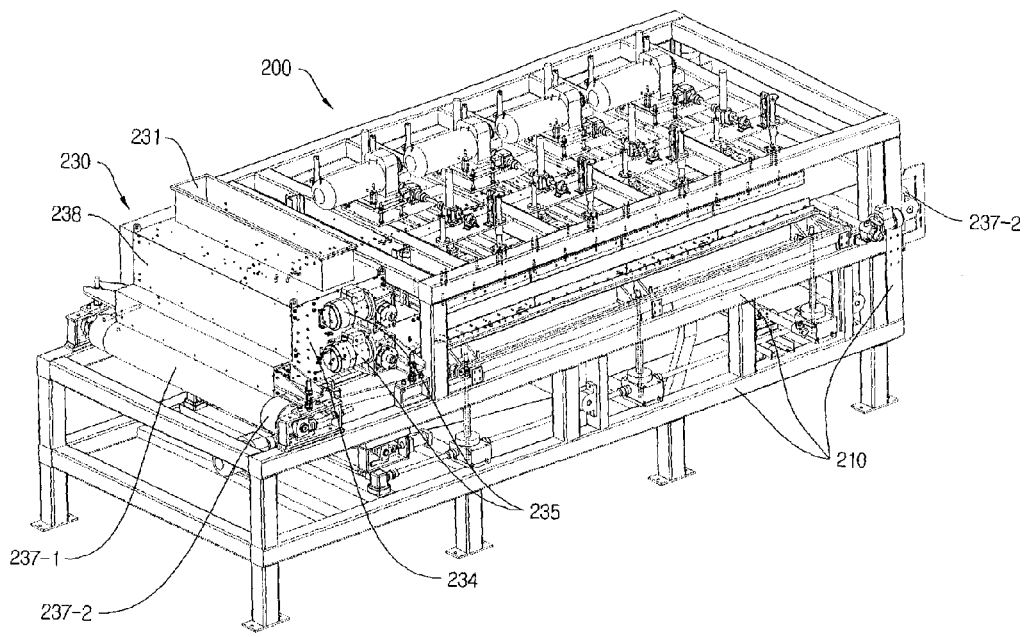
FIG. 15 is a perspective view illustrating an installation state of a sludge supplier of the electro-penetrative sludge weight reducing apparatus according to the present invention.
Figure 16:
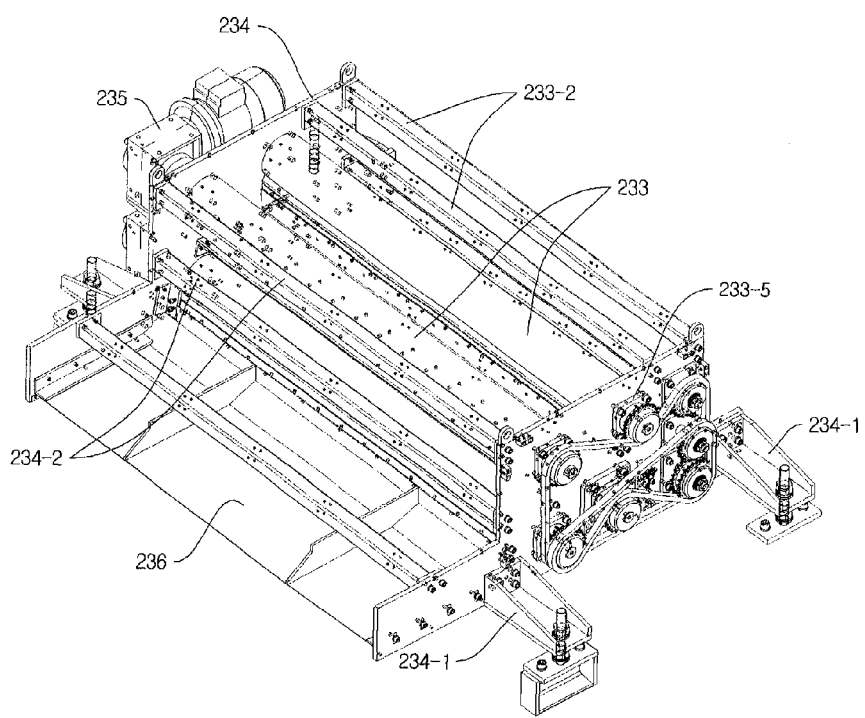
FIGS. 16 and 17 are perspective views illustrating an internal structure and an external structure of the sludge supplier, respectively.
Figure 17:
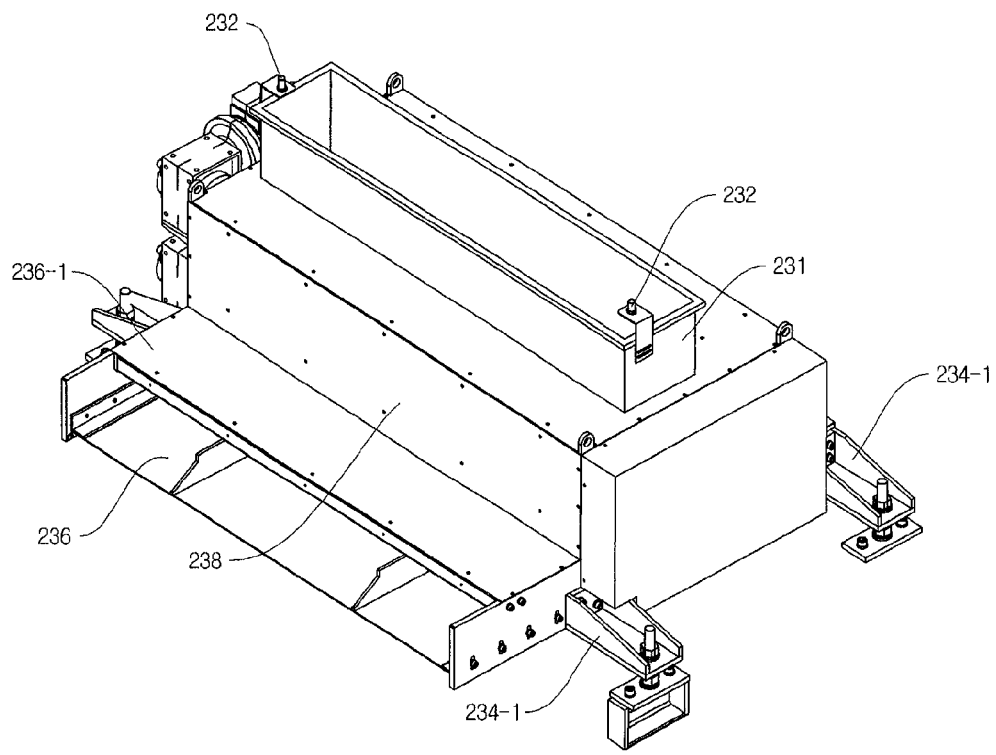
Figure 18:
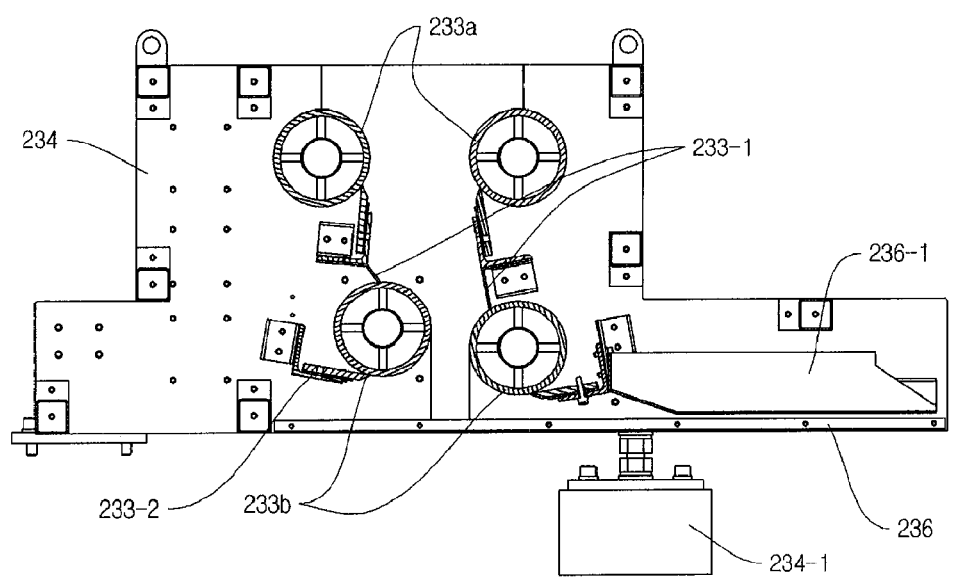
FIGS. 18 and 19 are right and left side views of the sludge supplier, respectively.
Figure 19:
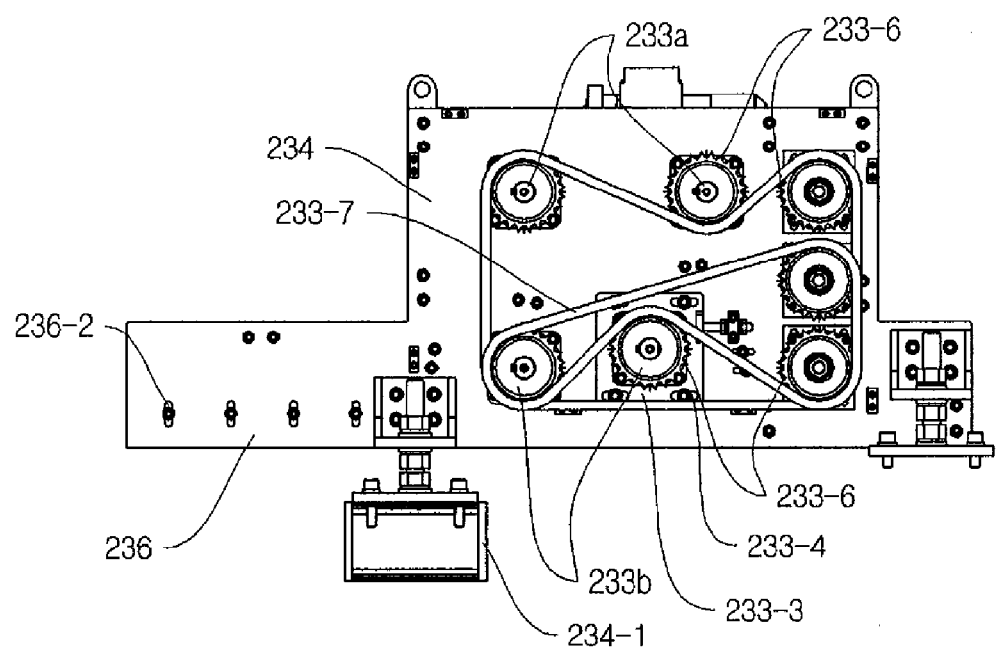

As shown in FIG. 14, the power terminal 242-1a is in contact with the side wall plate 242-3b of the insulation member 242-3 while being in contact with the second electrode plate 242-1, the hole located in. the power terminal 242-1a is adjusted to correspond to the fixation hole 242-6b1 located in the side wall plate 242-3b, and then the fixing member 242-7, which is the bolt or the screw, is coupled to fix the power terminal 242-1a and the side wall plate 242-3b.

The power terminal 242-1a assembled as described above protrudes from the side wall plate 242-3b to have a predetermined length while being closely fixed to the side wall plate 242-3b of the insulation member 242-3, and connects a power line by using the protruded power terminal 242-1a. Here, it is possible to secure a more stable insulation structure by preventing the second electrode plate 242-1 from being contacted with metallic materials through the fixing member 242-7 because the fixation hole 242-6b1 located in the side wall plate 242-3b of the insulation member 242-3 does not penetrate the side wall plate 242-3b.

Meanwhile, when the sludge discharged from the sludge supplier 230 moves along the filter cloth 221 operated by the motor of the filter cloth conveyor 220, the first electrode module 241n located above the filter cloth 221 is descended and the second electrode part 242 located under the filter cloth 221 is elevated using the height adjusting means 242-4, so that the filter cloth 221 is located between the first electrode part 241 of the second electrode part 242 and the second electrode plate 242-1 of the second electrode part 242.

As shown in FIG. 7, when a rotation of the driving motor 255 driven through the controller 227 is converted to vertically moving force via the gear box 254, the pressurizing member 257 following the gear box 254 is descended and the first electrode module 241n descends the plate-shaped fixing plate 251 and also descends the first electrode part 241 forming a positive (+) electrode.

The movement of the first electrode part 241 is performed through a continuous descent of the fixing plate 251 after the insulation member 256-1 and the insulation member 256-2 are compressed by the fixing plate 251 descending along the screw jack 252. For example, when the first electrode part 241 and the second electrode part 242-1 are located to correspond to the filter cloth 221, sludge laid on the filter cloth 221 is compressed and an electric field is formed by a voltage supplied to the first electrode part 241 and the second electrode plate 242-1, which implements a dehydration operation through compression of the sludge and a moisture dehydration operation according to a charge through the electric field.

The electro-penetrative type sludge weight reducing apparatus according to the embodiments of the present invention includes the first electrode plate 241-1 for conveying the sludge through the filter cloth 221 having an infinite orbit, moving to the sludge from an upper portion of the filter cloth 221 to apply a pressure to the sludge, and forming a positive (+) electrode with an applied voltage, and the second electrode plate 242-1 for forming a negative (−) electrode with an applied voltage to charge moisture included in the sludge as shown in FIG. 7. As a result, the moisture charged by the electric field is drained from the sludge and the dehydration is performed.

In the electro-penetrative type sludge weight reducing apparatus described above, the first electrode plate 241-1 and the second electrode plate 242-1 forming the electric field are independently formed in the unit of a module having a predetermined size, and the first electrode plate 241-1 and the second electrode plate 242-1 are infinitely connected to each other to correspond to a length of the filter cloth 221, so that a dehydration capability for the sludge may be improved.

Meanwhile, referring to FIGS. 15 to 19, the sludge supplier 230 of the electro-penetrative type sludge weight reducing apparatus according to the embodiments of the present invention is as follows.

The sludge supplier 230 supplies sludge provided from an outside to the filter cloth (not shown) in order to maximize a moisture reducing efficiency of the sludge, the sludge having a uniform thickness. Specifically, the sludge supplier 230 is installed such that the sludge supplier 230 is closely located to the filter cloth and coupled with the frame 210, and includes left/right side plates 234, a sludge supply roller 233, a sludge supply roller driving means 235, a thickness adjusting means 236, and a conveying means 237.

First, the left/right side plates 234 are seated on the frame 210 and supported by a coupling member 234-1. Further, the left/right side plates 234 stand while facing each other by means of a plurality of fixing members 234-2 arranged in a direction crossing the left/right side plates 234.

Next, the sludge supply roller 233 has several top and bottom rows for the left/right side plates 234 and is rotatably installed to uniformly supply sludge. Here, an arrangement direction of the sludge supply roller 233 may be a direction crossing the left/right side plates 234 like the fixing members 234-2. Further, the sludge supply roller 233 includes a pair of upper rolls 233a installed such that the upper rolls 233a are faced to each other and spaced apart from each other in an upper portion of the left/right side plate 234, and a pair of lower rolls 233b installed such that the lower rolls 233b are faced to each other and spaced apart from each other for the left/right side plate 234 in a lower portion of the upper rolls 233a. Here, rotating directions of the rolls facing each other are set as opposite directions from each other, and thus a supply amount of the sludge supplied to the filter cloth from the sludge supplier 230 is uniformly controlled. Meanwhile, a guide member 233-1 for guiding the sludge is installed between the upper roll 233a and the lower roll 233b, and a scraper 233-2 for preventing the sludge attached to a surface of the roll from moving to a rear side is installed in the upper roll 233a and the lower roll 233b.

Further, at least one roll among the lower rolls 233b is installed such that a fixed position is changed in a left or right direction for the left/right side plate 234 by a moving member 233-3 and controls a spaced distance between rolls. Accordingly, a supplying pressure of the sludge supplied via the lower roll 233b may be variably controlled. Here, each of the moving members 233-3 rotatably support both end portions of the lower roll 233b in a bracket form and are extended in a left or right direction in an edge portion, the moving member 233-3 being screw-connected with the left/right side plate 234 through a long hole 233-4.

Next, the sludge supply roller driving means 235 enables the sludge supply roller 233 to be rotated for the left/right side plate 234. For example, the sludge supply roller driving means 235 may include each electric motor for individually operating the upper roll 233a and the lower roll 233b. Further, the sludge supply roller driving means 235 includes a bearing 233-5 for enabling the sludge supply roller 233 to be rotated for the left/right side plate 234, a sprocket 233-6 coupled to a front end portion of the sludge supply roller 233, and a chain 233-7 for connecting sprockets 233-6 to transfer power. Further, according to a control of the controller (not shown), a rotating direction and a speed of the upper roll 233a and the lower roll 233b may be independently controlled.

Next, the thickness adjusting means 236 includes a lid member 236-1 installed such that a fixed position is changed in an upward or downward direction of the left/right side plate 234, and can finally control a thickness of the sludge discharged through the lid member 236-1. That is, the thickness adjusting means 236 can freely control the thickness of the sludge supplied to the filter cloth and uniformly distribute the sludge over entire widths of the conveying means 237. Meanwhile, the left/right side plate 234 is extendly formed in an upward or downward direction and is fixed through a screw-connection with the lid member 236-1 by the long hole 236-2.

Next, the conveying means 237 includes a conveyor belt 237-1 installed under the sludge supply roller 233 and the thickness adjusting means 236, and a conveyor roller 237-2 for winding and rotating the conveyor belt 237-1. Here, the conveyor belt 237-1 supplies the sludge discharged via the thickness adjusting means 236 by a driving of the sludge supply roller 233 to the filter cloth. Further, the conveyor roller 237-2 driving the conveyor belt 237-1 may be rotatably driven by the motor (not shown).

Meanwhile, the sludge supplier 230 includes the hopper 231 for storing a predetermined amount of sludge supplied to the sludge supply roller 233, and the hopper 231 is installed above the sludge supply roller 233. Meanwhile, the hopper 231 includes a sludge supply amount detecting sensor 232, and the sludge supply amount detecting sensor 232 may be implemented by a photo sensor for detecting an amount of the sludge supplied to an inside of the hopper 231 from an outside.

Meanwhile, the controller can calculate an amount of the sludge within the hopper 231 through a signal detected by the sludge supply amount detecting sensor 232. Further, the controller can control a rotation and a rotating speed of the sludge supply roller driving means 235 through a signal input from the sludge supply amount detecting sensor 232. That is, when the sludge supply amount detecting sensor 232 cannot detect the remaining sludge within the hopper 231, the controller stops an operation of the sludge supply roller driving means 235 to prevent an unnecessary power loss. Further, when the sludge supply amount detecting sensor 232 detects sludge exceeding a capacity of the hopper 231, the controller stops the supply of sludge to the hopper 231 and also stops operations of elements related to the supply of the sludge. Accordingly, when the supply of the sludge is performed from an outside to the hopper 231, the controller operates the sludge supply roller driving means 235 to correspond to a supply amount of the sludge detected by the sludge supply amount detecting sensor 232.

Meanwhile, the cover member 238 is assembled with the left/right side plate 234 in order to hide or prevent the bearing 233-5 of the sludge supply roller 233 or the sludge supply roller driving means 235, the sprocket 233-6, and the chain 233-7 from an outside.

Meanwhile, the sludge supply roller 233 uniformly compresses sludge to supply the compressed sludge to the thickness adjusting means 236. Here, the controller properly controls a rotating speed of the motor according to a kind of sludge based on an oil content included in the controller to control a supply speed of the sludge supplied to the filter cloth.

Further, in the sludge supply roller 233, at least one of a pair of lower rolls 233b can control a fixed position for the left/right side plate 234 through the moving member 233-3, so that a supply pressure of the sludge may be controlled up to a desired level through a control of a spaced distance between the rolls.

Furthermore, the thickness adjusting means 236 can freely control a thickness of the sludge discharged to the filter cloth by the lid member 236-1 installed such that a fixed position is changed in an upward or downward direction for the left/right side plate 234, and uniformly distribute the sludge discharged through the thickness adjusting means 236 over entire widths of the conveying means 237, so that the electro-penetrative type sludge weight reducing apparatus 200 can induce applying of an electric field over entire surfaces of the sludge, which prevents damage of facilities according to wear of an electrode and maximizes a moisture reducing efficiency of the sludge.

The aforementioned terms are terminologies set under the consideration of functions applied to the present invention and they may be changed by an intention of a producer or a convention, so that the definitions of the terms should be defined based on contents included in the specification. Further, although the present invention has described the electro-penetrative type sludge weight reducing apparatus having a specific shape and structure with reference to accompanying drawings for embodiments of the present invention, those skilled in the art will appreciate that various modifications, additions and substitutions are possible, without departing from the scope and spirit of the invention as disclosed in the accompanying claims.

INDUSTRIAL APPLICABILITY

The electro-penetrative type sludge weight reducing apparatus according to various embodiments of the present invention may be applied to and used for industrial fields dehydrating the sludge.

What is claimed is:

1. An electro-penetrative type sludge weight reducing apparatus comprising:
   a frame having a predetermined shape;
   a filter cloth conveyor configured to infinitely rotate a filter cloth and formed in a lengthwise direction of the frame;
   a sludge supplier configured to supply sludge to an upper portion of the filter cloth and formed in one side of the filter cloth conveyor;
   a dehydrator for compressing sludge supplied to an upper portion of the filter cloth conveyor by first and second electrode parts, applying a voltage, and forming an electric field to dehydrate the sludge, the dehydrator including the first electrode part formed above the filter cloth conveyed by the filter cloth conveyor and the second electrode part formed under the filter cloth to face the first electrode part;
   a driver configured to elevate the dehydrator and fixedly formed on the frame above the dehydrator; and
   a controller for controlling the driver to control a compression height of the dehydrator for the sludge and controlling a voltage applied to the first and second electrode parts,
   wherein the dehydrator dehydrates the sludge supplied to the upper portion of the filter cloth conveyor by a substantially identical pressure and voltage, and
   the driver is interworked with rotation of a driving motor to elevate the first electrode part, the driver including a fixing plate fixedly formed on the frame, at least two screw jacks inserted through one side of the fixing plate to be fixedly coupled to one side of the first electrode part, interworking shafts for providing rotation force to the screw jacks, a gear box for changing a speed of the rotation force provided to each of the interworking shafts, and a driving motor for providing rotation force to the gear box.

2. The electro-penetrative type sludge weight reducing apparatus as claimed in claim 1, wherein the screw jack includes four screw jacks inserted through four corners of the fixing plate to be fixedly coupled to four corners corresponding to the first electrode part.

3. The electro-penetrative type sludge weight reducing apparatus as claimed in claim 1, wherein the controller controls the first electrode part of the dehydrator to gradually descend the first electrode part in a direction toward the sludge according to a dehydration amount of the sludge and applies an identical pressure and voltage.

4. The electro-penetrative type sludge weight reducing apparatus as claimed in claim 3, wherein the first electrode part includes a first electrode plate configured to apply a substantially identical pressure and voltage to the sludge, voltage terminals configured to apply a voltage to the first electrode plate and arranged such that the voltage terminals are uniformly spaced apart from each other on the first electrode plate, and a conductive member configured to conduct a voltage to the voltage terminals.

5. The electro-penetrative type sludge weight reducing apparatus as claimed in claim 1, wherein the first electrode part further includes a reinforcement member for reinforcing and supporting the first electrode plate.

6. The electro-penetrative type sludge weight reducing apparatus as claimed in claim 1, further comprising a height detector for calculating a number of rotations of the interworking shaft or the driving motor to detect a compression height of the first electrode part and detecting a compression height for the sludge of the first electrode part of the dehydrator by the driver.

7. The electro-penetrative type sludge weight reducing apparatus as claimed in claim 1, further comprising a guide fixedly formed on the first electrode part by being inserted through the fixing plate and an elevation limit detector for detecting an elevation limit of the guide according to an elevation of the first electrode part of the dehydrator by the driver.

8. The electro-penetrative type sludge weight reducing apparatus as claimed in claim 1, further comprising an exhaust pipe for discharging wet steam generated from sludge gradually dehydrated by the dehydrator, the exhaust pipe being fixedly formed on the first electrode part of the dehydrator.

9. The electro-penetrative type sludge weight reducing apparatus as claimed in claim 1, further comprising a ventilator for supplying wet stream generated from sludge in which dehydration is completed by the dehydrator, the ventilator being fixedly formed on the frame in an opposite side of the filter cloth conveyor.

10. The electro-penetrative type sludge weight reducing apparatus as claimed in claim 1, further comprising left/right side plates 234 facing each other, a sludge supply roller 233 arranged in a structure having a plurality of rows on the left/right side plates 234, a conveying means 237 for supplying sludge discharged by a sludge supply roller driving means 235 operating the sludge supply roller 233 to a sludge dehydrating apparatus, and a hopper 231 installed above the sludge supply roller 233 in order to allow a predetermined amount of sludge supplied to the sludge supply roller 233 to stay in the hopper 231,
   wherein the sludge supply roller 233 includes a pair of upper rolls 233a installed such that the upper rolls 233a are faced to each other and spaced apart from each other in an upper portion of the left/right side plates 234, and a pair of lower rolls 233b installed such that the lower rolls 233b are faced to each other and spaced apart from each other in a lower portion of the upper rolls 233a and each of rotating directions of the rolls facing each other are set as an opposite direction from each other, and the sludge supply roller 233 further includes a guide member 233-1 installed so as to guide the sludge between the upper roll 233a and the lower roll 233b.

11. The electro-penetrative type sludge weight reducing apparatus as claimed in claim 10, wherein the left/right side plates 234 is seated on a frame 210 for supporting a sludge dehydrating apparatus and supported by means of a coupling member 234-1, and the left/right side plates 234 are installed to stand with respect to the frame 210 by means of a fixing member 234-2.

12. The electro-penetrative type sludge weight reducing apparatus as claimed in claim 10, wherein at least one of the lower rolls 233b is installed to change a fixed position by means of a moving member 233-3 with respect to the left/right side plates 234.

13. The electro-penetrative type sludge weight reducing apparatus as claimed in claim 10, wherein a scraper 233-2 for preventing sludge attached to the upper roll 233a and the lower roll 233b from moving to a rear side is installed in the upper roll 233a and the lower roll 233b.

14. The electro-penetrative type sludge weight reducing apparatus as claimed in claim 10, further comprising a sludge supply amount detecting sensor 232 for detecting an amount of sludge staying in the hopper 231.

15. The electro-penetrative type sludge weight reducing apparatus as claimed in claim 14, further comprising a controller for controlling an operation of the sludge supply roller driving means 235 by means of a signal output from the sludge supply amount detecting sensor 232.

16. An electro-penetrative type sludge weight reducing apparatus for compressing sludge from an upper part and a lower part of a filter cloth 221, forming an electric field with supplied power, and charging moisture within the sludge to implement dehydration, the filter cloth 221 configured to convey sludge through an infinite orbit rotation while winding a plurality of rollers and horizontally arranged, the electro-penetrative type sludge weight reducing apparatus comprising:

first electrode modules 241n for converting a rotation of a driving motor 255 to a vertically moving force to compress sludge by a first electrode plate 241-1 and forming a positive (+) electrode with supplied power, the first electrode modules 241n including one or more first electrode plates 241-1 closely arranged to each other according to a uniformly divided length of the filter cloth 221 above the filter cloth 221; and second electrode parts 242 for forming a negative (−) electrode with supplied power to charge moisture within the sludge together with the first electrode plates 241-1, the second electrode parts 242 including second electrode plates 242-1 arranged to have an identical size and number to those of the first electrode plates 241-1 under the filter cloth 221, wherein the second electrode part 242 is mounted to a lower frame 211 having a height adjusting means 242-4 for adjusting a height for the filter cloth 221 and the first electrode module 241n is mounted to an upper frame 212 forming an upper part of the lower frame 211, and the filter cloth 221 for winding a plurality of rollers installed in the lower frame 211 and the upper frame 212 to be rotated by power of a motor in a horizontal state and conveying sludge discharged from the sludge supplier 230 installed in one side of the upper frame 212, the filter cloth 221 having a longer length than that of the upper frame 212.

17. An electro-penetrative type sludge weight reducing apparatus for compressing sludge from an upper part and a lower part of a filter cloth 221, forming an electric field with supplied power, and charging moisture within the sludge to implement dehydration, the filter cloth 221 configured to convey sludge through an infinite orbit rotation while winding a plurality of rollers and horizontally arranged, the electro-penetrative type sludge weight reducing apparatus comprising:

first electrode modules 241n for converting a rotation of a driving motor 255 to a vertically moving force to compress sludge by a first electrode plate 241-1 and forming a positive (+) electrode with supplied power, the first electrode modules 241n including one or more first electrode plates 241-1 closely arranged to each other according to a uniformly divided length of the filter cloth 221 above the filter cloth 221; and second electrode parts 242 for forming a negative (−) electrode with supplied power to charge moisture within the sludge together with the first electrode plates 241-1, the second electrode parts 242 including second electrode plates 242-1 arranged to have an identical size and number to those of the first electrode plates 241-1 under the filter cloth 221, wherein the first electrode module 241n includes a driving motor 255 driven by a control of a controller 227, a driver for converting a rotation of the driving motor 255 to an upward/downward movement, and a first electrode part 241 for receiving a moving force in a downward direction of the driver to pressurize sludge laid on the filter cloth 221 and forming an electric field with a supplied voltage.

18. The electro-penetrative type sludge weight reducing apparatus as claimed in claim 17, wherein the driver includes a gear box 254 for receiving a rotation of the driving motor 255 to convert the rotation of the driving motor 255 to a vertical straight direction, pressurizing members 257 for following a straight movement of the gear box 254, a plate-shaped fixing plate 251 for receiving power through the pressurizing member 257 to move, screw jacks for allowing the fixing plate 251 to be located in its position and guiding a movement of the fixing plate 251, an insulation member 256-1 provided to the screw jack 252 of the fixing plate 251, and an insulation member 256-2 installed in the fixing plate 251.

19. The electro-penetrative type sludge weight reducing apparatus as claimed in claim 18, wherein the pressurizing members 257 includes a pair of pressurizing members 257 arranged in both sides of the gear box 254, and the screw jacks 252 are provided to four corner portions of the fixing plate 251.

20. The electro-penetrative type sludge weight reducing apparatus as claimed in claim 17, wherein the first electrode part 241 includes the first electrode plate 241-1 including at least one power terminal 241-1a for receiving a voltage through a controller 227 to form a positive (+) electrode, an insulation member 241-6 made of insulation materials to have an insulation structure for the first electrode plate 241-1, a mounting frame 241-7 fixed by a fixing member 241-8 inserted to an inner space of an upper portion of the insulation member 241-6 to be coupled to a side surface of the insulation member 241-6 and to form a space with which the power terminal 241-1a is not in contact, the mounting frame 241-7 being made of steel materials, and a fixing member 241-9 coupled to the upper portion of the insulation member 241-6 without extending through the first electrode plate 241-1.

21. The electro-penetrative type sludge weight reducing apparatus as claimed in claim 20, wherein the insulation member 241-6 includes a base plate 241-6a including a side wall plate 241-6b having a predetermined width and height and forming an edge to form a space part 241-6c in which the power terminal 241-1a welded to the first electrode plate 241-1 inwardly protrudes, wherein the space part 241-6c is partitioned by partition walls having an identical width and height to those of the side wall plate 241-6b to be divided into a plurality of spaces and a plurality of tap holes are processed in the base plate 241-6a and the side wall plate 241-6b.

22. The electro-penetrative type sludge weight reducing apparatus as claimed in claim 20, wherein the power terminal 241-1a includes a welding bolt 241-1a1 welded to the first electrode plate 241-1 to connect a power line with the first electrode plate 241-1, a nut 241-1a2 coupled to the welding bolt 241-1a1, and a seal 241-1a3 patched on a position where the nut 241-1a2 is located.

23. The electro-penetrative type sludge weight reducing apparatus as claimed in claim 20, wherein the mounting frame 241-7 includes a frame body 241-7a having an empty space and a predetermined thickness and a rigid body 241-7b crossing a center of a width of the frame body 241-7a to strengthen the rigidity.

24. An electro-penetrative type sludge weight reducing apparatus for compressing sludge from an upper part and a lower part of a filter cloth 221, forming an electric field with supplied power, and charging moisture within the sludge to implement dehydration, the filter cloth 221 configured to convey sludge through an infinite orbit rotation while winding a plurality of rollers and horizontally arranged, the electro-penetrative type sludge weight reducing apparatus comprising:

first electrode modules 241*n* for converting a rotation of a driving motor 255 to a vertically moving force to compress sludge by a first electrode plate 241-1 and forming a positive (+) electrode with supplied power, the first electrode modules 241*n* including one or more first electrode plates 241-1 closely arranged to each other according to a uniformly divided length of the filter cloth 221 above the filter cloth 221; and second electrode parts 242 for forming a negative (−) electrode with supplied power to charge moisture within the sludge together with the first electrode plates 241-1, the second electrode parts 242 including second electrode plates 242-1 arranged to have an identical size and number to those of the first electrode plates 241-1 under the filter cloth 221, wherein the second electrode parts 242 include a plurality of second electrode plates 242-1 having one or more power terminals 242-1*a* to independently receive supplied power, supports 242-2 for individually surrounding the second electrode plates 242-1, an insulation member 242-3 for surrounding the plurality of second electrode plates 242-1 closely arranged to each other for insulation, a steel material support frame 242-5 for fixing the insulation member 242-3, fixing members 242-2*a*, 242-5*b*, and 242-7 coupled to a plurality of fixation holes 242-6*a*1, 242-6*a*2, and 242-6*b*1 having a depth not to extend through a thickness of the insulation member 242-3 in a top surface, a bottom surface, and a side surface of the insulation member 242-3.

25. The electro-penetrative type sludge weight reducing apparatus as claimed in claim 24, wherein the power terminal 242-1*a* is in contact with the second electrode plate 242-1 while being fixed to the insulation member 242-3 by the fixing member 242-7.

26. The electro-penetrative type sludge weight reducing apparatus as claimed in claim 24, wherein the support 242-2 surrounds a side surface of the second electrode plate 242-1 in a lengthwise direction while an upper surface of the second electrode plate 242-1 is exposed.

27. The electro-penetrative type sludge weight reducing apparatus as claimed in claim 24, wherein the insulation member 242-3 includes a base plate 242-3*a* forming a bottom surface and a side wall plate 242-3*b* having a predetermined height and being bent to form a side surface of the base plate 242-3*a*.

28. The electro-penetrative type sludge weight reducing apparatus as claimed in claim 27, wherein the base plate 242-3*a* has a length to allow only one side wall plate 242-3*b* to be formed so that the insulation members 242-3 has a pair of insulation members 242-3 having an identical structure to each other in assembling.

29. The electro-penetrative type sludge weight reducing apparatus as claimed in claim 27, wherein the support frame 242-5 has a structure in which a bottom surface of the support frame 242-5 is opened, and includes at least one coupling end 242-5*a* assembled with another component.

\* \* \* \* \*